United States Patent
Sugino et al.

(10) Patent No.: US 8,611,394 B2
(45) Date of Patent: Dec. 17, 2013

(54) RECEPTION DEVICE

(75) Inventors: Satosi Sugino, Osaka (JP); Yoshifumi Suehiro, Osaka (JP); Atushi Okita, Osaka (JP); Masanori Hayasi, Osaka (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 12/994,249

(22) PCT Filed: Apr. 22, 2009

(86) PCT No.: PCT/JP2009/057960
§ 371 (c)(1),
(2), (4) Date: Nov. 23, 2010

(87) PCT Pub. No.: WO2009/145018
PCT Pub. Date: Dec. 3, 2009

(65) Prior Publication Data
US 2011/0069738 A1    Mar. 24, 2011

(30) Foreign Application Priority Data

May 27, 2008 (JP) ................................. 2008-138679

(51) Int. Cl.
*H04B 1/69* (2011.01)
(52) U.S. Cl.
USPC .......................................................... 375/130
(58) Field of Classification Search
USPC ......... 375/130, 133, 137, 139, 145, 147, 149, 375/259, 260, 344, 345, 355
See application file for complete search history.

(56) References Cited

U.S. PATENT DOCUMENTS

| 6,069,581 | A | 5/2000 | Bell et al. | |
|---|---|---|---|---|
| 6,937,646 | B1 | 8/2005 | McCorkle | |
| 7,286,599 | B1 * | 10/2007 | Cheah | 375/238 |
| 2005/0018750 | A1 | 1/2005 | Foerster et al. | |
| 2005/0069062 | A1 * | 3/2005 | Krivokapic | 375/343 |
| 2005/0175125 | A1 * | 8/2005 | Krivokapic | 375/340 |
| 2005/0264438 | A1 | 12/2005 | Fullerton et al. | |
| 2006/0285578 | A1 | 12/2006 | Weisenhorn et al. | |
| 2007/0110125 | A1 | 5/2007 | Fujita et al. | |
| 2007/0155348 | A1 | 7/2007 | Razavi et al. | |
| 2008/0069183 | A1 | 3/2008 | Terada | |

(Continued)

FOREIGN PATENT DOCUMENTS

| EP | 1717598 | 11/2006 |
|---|---|---|
| EP | 1732257 | 12/2006 |

(Continued)

OTHER PUBLICATIONS

Extended European Search Report, dated Nov. 23, 2011, for corresponding European Patent Application No. 09754526.

(Continued)

*Primary Examiner* — Young T. Tse
(74) *Attorney, Agent, or Firm* — Greenblum & Bernstein, P.L.C.

(57) ABSTRACT

A reception device is provided with an expander for frequency-converting a reception signal, by multiplying a station-transmitted signal output from an oscillator and having a frequency different from a center frequency of the reception signal, and the reception signal, and outputting an intermediate signal. The oscillator intermittently operates in synchronization with generation timings of short pulse waves included in the reception signal. Thus, the reception device can reduce power consumption more using an ultra wide band (UWB) communication system.

29 Claims, 13 Drawing Sheets

(56) References Cited

U.S. PATENT DOCUMENTS

| | | |
|---|---|---|
| 2009/0154526 A1 | 6/2009 | Okita et al. |
| 2009/0256739 A1 | 10/2009 | Teshirogi et al. |
| 2010/0040168 A1* | 2/2010 | Fujita et al. ............ 375/295 |

FOREIGN PATENT DOCUMENTS

| | | |
|---|---|---|
| EP | 1736795 | 12/2006 |
| JP | 2006-094169 | 4/2006 |
| JP | 2006-112915 | 4/2006 |
| JP | 2006-525688 | 11/2006 |
| JP | 2007-518301 | 7/2007 |
| JP | 2008-72405 | 3/2008 |
| WO | 2005/074150 | 8/2005 |
| WO | 2006/025577 | 3/2006 |

OTHER PUBLICATIONS

Partial European Search Report, dated Sep. 5, 2012, for corresonding European Patent Application No. 12004307.0.

European Patent Office (E.P.O.) extended European Search Report, mailed Nov. 26, 2012, in related European patent application.

Japan Office Action, mailed Feb. 12, 2013, in Japanese Patent Application No. 2010-514417.

* cited by examiner

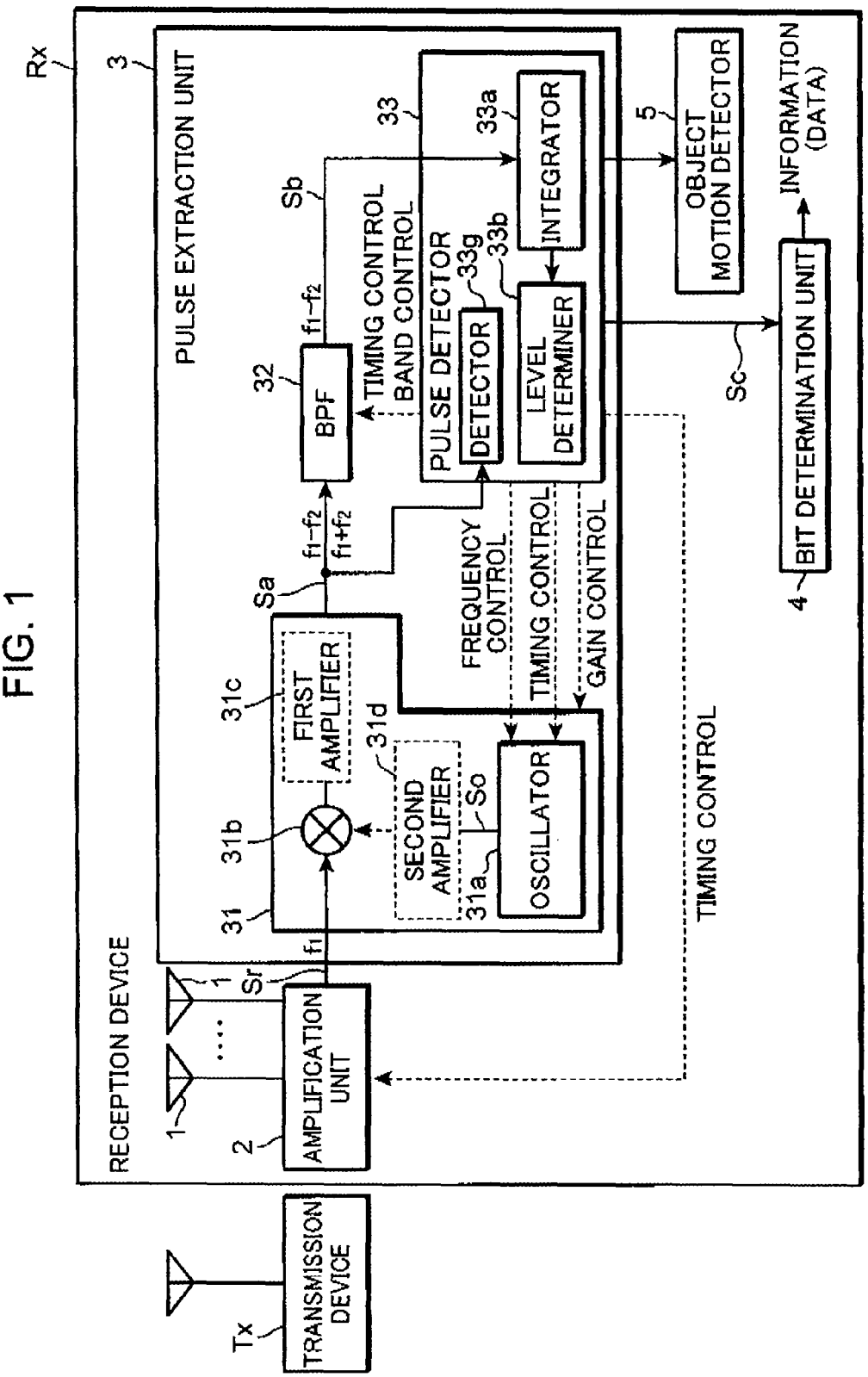

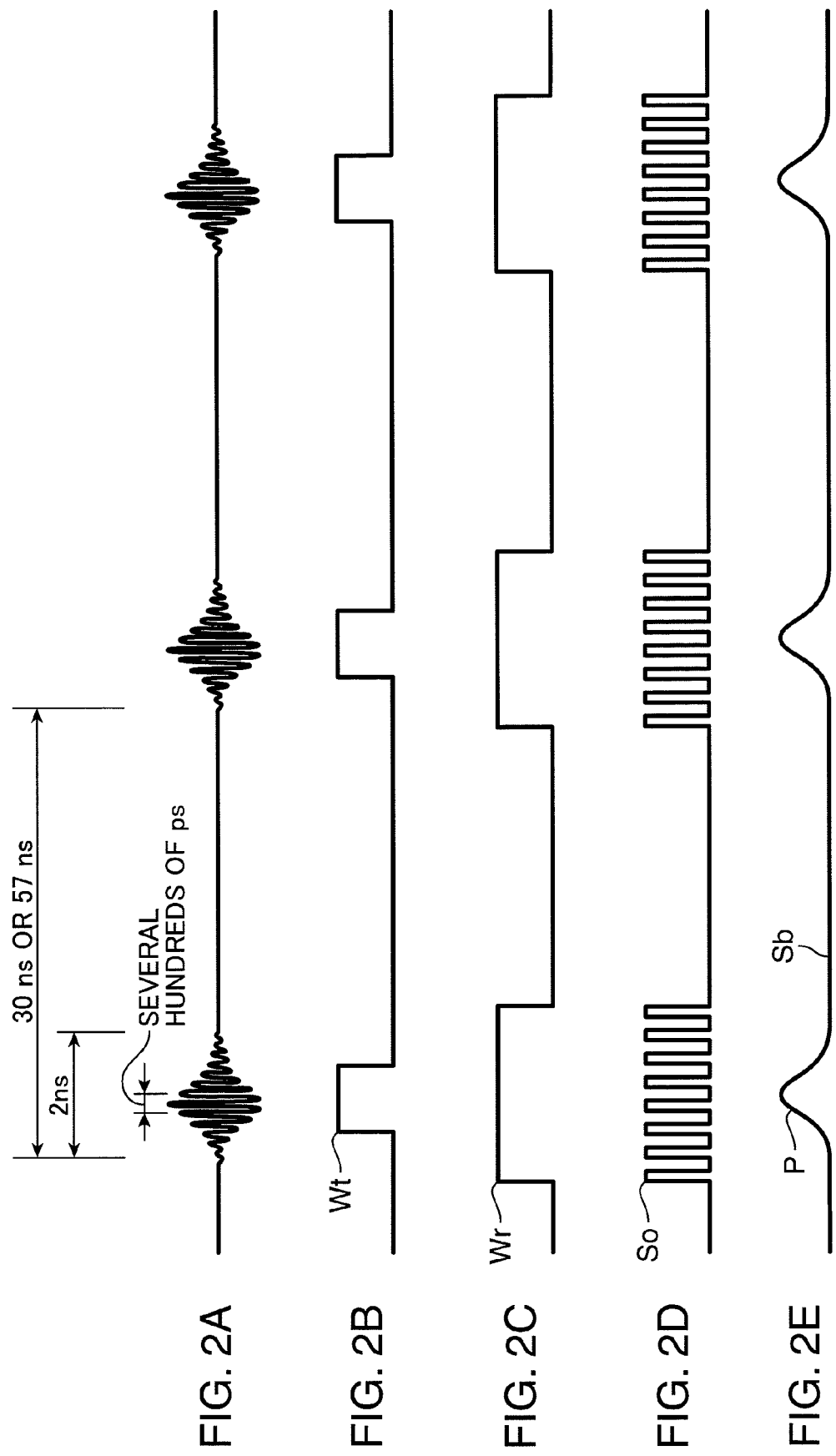

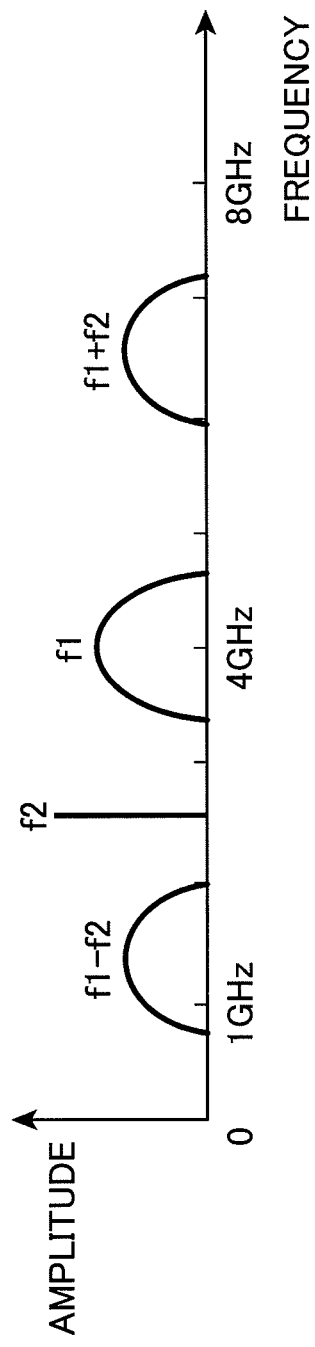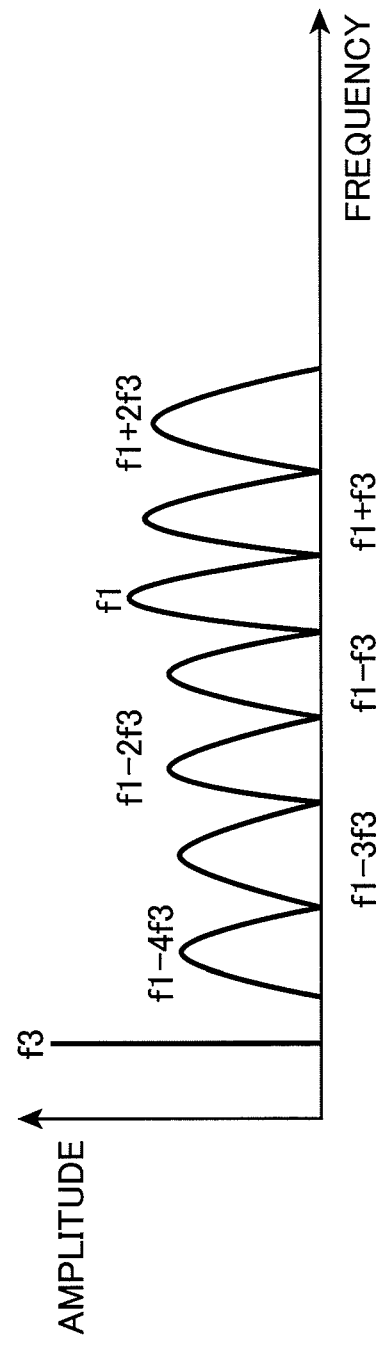

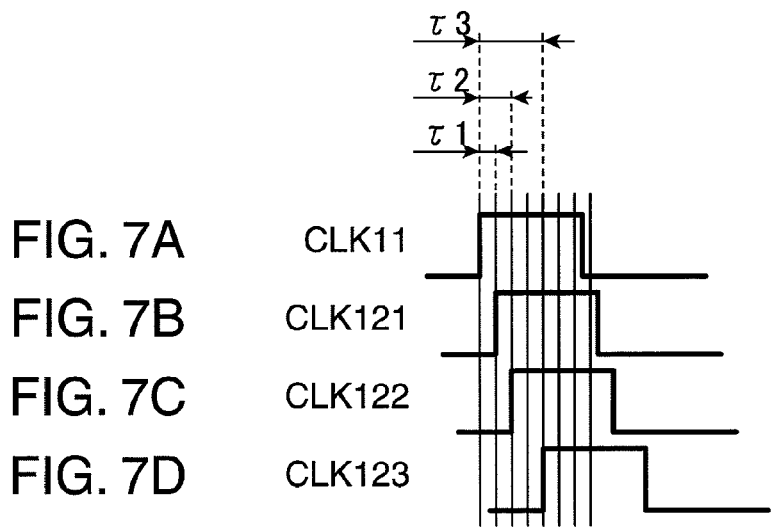
FIG. 7A CLK11
FIG. 7B CLK121
FIG. 7C CLK122
FIG. 7D CLK123
FIG. 8
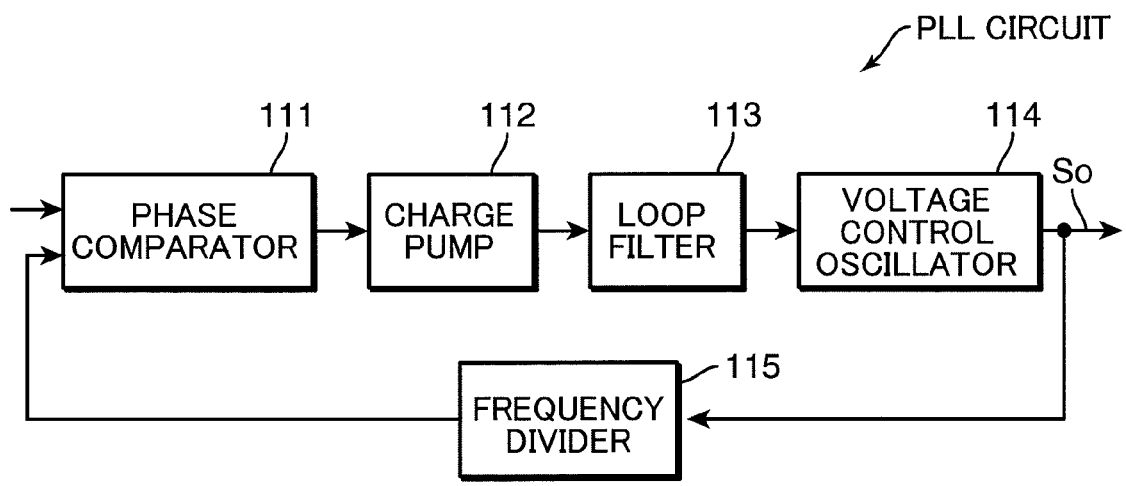
FIG. 9A
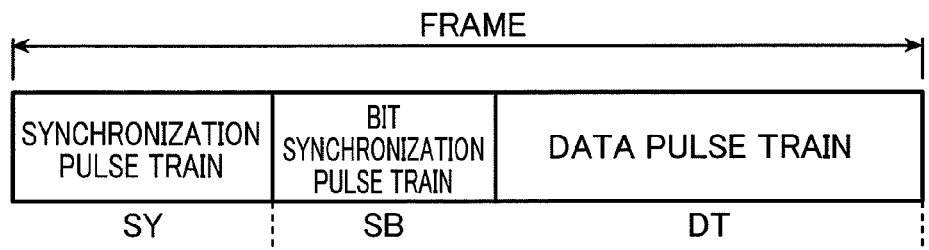
FIG. 9B

(TRANSMISSION PULSE IS EMITTED AT TIME 0)

RECEPTION DEVICE

TECHNOLOGICAL FIELD

The present invention relates to a reception device suitably used for an ultra wide band system.

BACKGROUND ART

In recent years, detection information of various sensors, operation information of switches and the like have been transmitted via radio communication and it has been proposed to use an ultra wide band (hereinafter, abbreviated as "UWB") communication system for this radio communication. In this UWB communication system, frequencies used are in a GHz band (e.g. 3.1 to 10.6 GHz) and a bandwidth is specified to be 25% or higher than a center frequency of communication or 450 MHz or higher. In the UWB communication system, upon transmitting data, ultra wide band communication is carried out using a pulse train composed of pulse signals synchronized with predetermined cycle timings. As one mode, without using a carrier wave, communication is carried out using a pulse train composed of pulse signals whose pulse widths are very short, such as 1 nsec or shorter (short pulse waves, ultra short pulse waves).

In this mode, one of differences between the UWB communication system and other communication systems is the presence or absence of the carrier wave. In other communication systems, a sine wave having a predetermined frequency is, for example, used as a carrier wave and communication is carried out by modulating this carrier wave in various manners. On the other hand, in the UWB communication system, communication is carried out by using short pulse waves in an ultra wide band without using a carrier wave (see, for example, patent literature 1). In the case of using OOK (On Off keying) in its modulation system, the value of a data is expressed by the presence or absence of a pulse similar to ASK (Amplitude Shift Keying) and non-coherent communication using no phase information in the value of the data becomes possible.

A reception device using the UWB communication system for transmitting data in a non-coherent manner using short pulse waves transmitted from a transmission device at regular time intervals includes an expander at an input stage for outputting an intermediate signal obtained by frequency-converting a reception signal. This expander includes an oscillator for outputting a station-transmitted signal having a frequency different from a center frequency of the reception signal and a waveform independent of the phase and waveform of the short pulse waves included in the reception signal, and a mixer for outputting the intermediate signal by multiplying the reception signal and the station-transmitted signal. The oscillator of the expander constructed as above constantly operates, causing large power consummation of the reception device.

PRIOR ART LITERATURES

Patent Literature

Patent Literature 1: Japanese Unexamined Patent Publication No. 2006-94169

SUMMARY OF THE INVENTION

The present invention was developed in view of the above situation and an object thereof is to provide a reception device capable of reducing power consumption more using a UWB communication system.

A reception device according to the present invention is provided with an expander for frequency-converting a reception signal by multiplying a station-transmitted signal output from an oscillator and having a frequency different from a center frequency of the reception signal and the reception signal and outputting an intermediate signal. The oscillator intermittently operates in synchronization with generation timings of short pulse waves included in the reception signal. Thus, the reception device according to the present invention can reduce power consumption more using a UWB communication system.

The above and other objects, features and advantages of the present invention will become clear from the following detailed description and the accompanying drawings.

BRIEF DESCRIPTION OF THE DRAWINGS

FIG. 1 is a block diagram showing a construction of a reception device according to a first embodiment, FIG. 2 are charts showing signal waveforms of respective parts of the reception device shown in FIG. 1, FIG. 3 are graphs showing frequency conversion of an expander in the reception device shown in FIG. 1, FIG. 8 is a block diagram showing a construction of a PLL circuit usable in the oscillator in the reception device shown in FIG. 1, FIG. 9 are charts showing a frame configuration in a radio signal of a UWB communication system.

MODES FOR CARRYING OUT THE INVENTION

Figure 4:
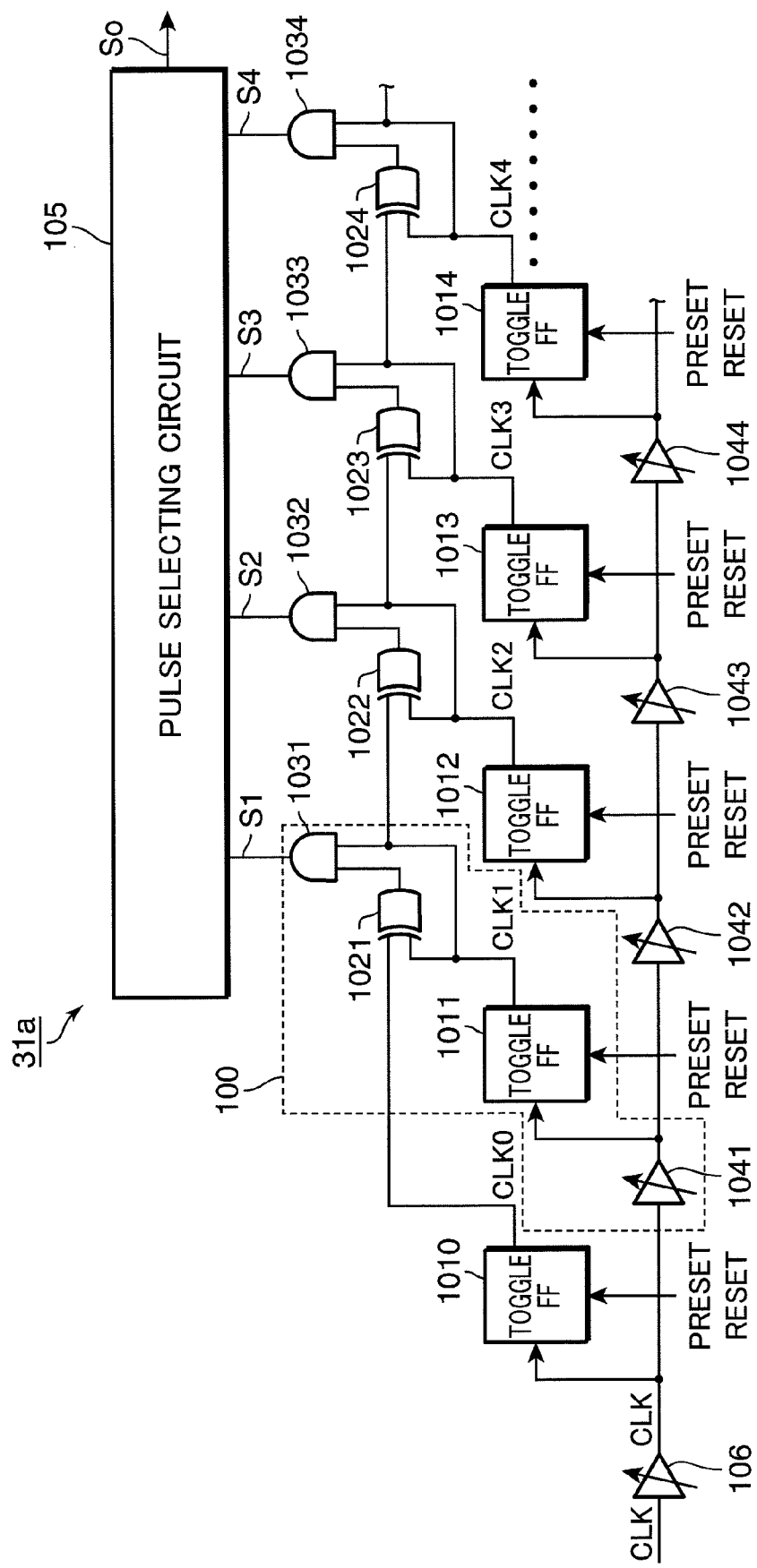
FIG. 4 is a diagram showing a construction of an oscillator in the reception device shown in FIG. 1.

Hereinafter, embodiments of the present invention are described with reference to the drawings. Note that constructions denoted by the same reference numerals in the respective drawings are identical and not repeatedly described. In this specification, constructions are denoted by reference numerals without suffixes when being collectively called

First Embodiment

FIG. 1 is a block diagram showing a construction of a reception device according to a first embodiment. Note that a transmission device Tx is also shown in FIG. 1 for the sake of description.

In FIG. 1, the reception device Rx is a device for receiving a communication signal using short pulse waves transmitted from the transmission device Tx at predetermined regular time intervals set beforehand by an ultra wide band communication system (hereinafter, abbreviated as "UWB communication system") for transmitting a data in a non-coherent manner, and includes, for example, an antenna 1, an amplification unit 2, a pulse extraction unit 3, a bit determination unit 4 and an unillustrated transmission signal information processing unit for processing transmission signal information by a predetermined signal processing.

The antenna 1 is a device for receiving a radio signal of the UWB communication system transmitted from the transmission device Tx and converts the radio signal in the form of a radio wave into a reception signal in the form of an electrical signal. The amplification unit 2 is a circuit connected to the antenna 1 and adapted to amplify the reception signal output from the antenna 1 at a predetermined amplification factor, and includes, for example, a low noise amplifier. These antenna 1 and amplification unit 2 are provided at a previous stage of the pulse extraction unit 3.

The pulse extraction unit 3 is connected to the amplification unit 2 and includes an expander 31, a filter 32 and a pulse detector 33.

The expander 31 is a circuit connected to the amplification unit 2 and adapted to output an intermediate signal Sa by frequency-converting a reception signal Sr obtained by receiving the radio signal transmitted from the transmission device Tx by the antenna 1. The expander 31 includes, for example, an oscillator 31a and a mixer 31b. The oscillator 31a is an oscillation circuit for outputting a station-transmitted signal So having a frequency f2, which has a sufficiently large difference from a frequency f1 of the reception signal Sr (frequency f1 is the center frequency of the reception signal Sr), and is frequency-controlled and timing-controlled by the pulse detector 33. The frequency f2 is lower than the frequency f1 (f2<f1) and has a frequency difference of several hundreds of MHz or more, more specifically e.g. 1 GHz or more, from the frequency f1. Further more specifically, in terms of enabling an easy design, the frequency f2 of the station-transmitted signal So output from the oscillator 31a is, for example, so set that the intermediate signal Sa has the same bandwidth as a target short pulse wave (see FIG. 2A) and an upper limit of a passband of the filter 32 is lower than a lower limit frequency of the target short pulse wave. The mixer 31b is a circuit connected to the amplification unit 2 and the oscillator 31a and adapted to output the intermediate signal Sa by multiplying the reception signal Sr and the station-transmitted signal So to mix the two signals Sr, So (mixing). The reception signal Sr (frequency f1) is down-converted by the expander 31 to become the intermediate signal Sa (frequency f1−f2, frequency f1+f2).

The filter 32 is connected to the mixer 31b of the expander 31 and provided at a subsequent stage of the expander 31. The filter 32 has a predetermined frequency range set beforehand as a passband with respect to the intermediate signal Sa output from the expander 31 and permits a part of the intermediate signal Sa output from the expander 31 in the predetermined frequency range to pass as an intermediate signal Sb. The filter 32 is band-controlled and timing-controlled by the pulse detector 33. The filter 32 includes, for example, a band-pass filter (BPF). The intermediate signal Sa is filtered by the filter 32 to become the intermediate signal Sb (frequency f1−f2).

The pulse detector 33 is a circuit connected to the filter 32 and adapted to output a pulse detection signal Sc by discriminating a pulse and the position of the pulse (discrimination of the pulse position on a time axis, discrimination of an arrival time of the pulse) based on the intermediate signal Sb output from the filter 32.

The bit determination unit 4 is a circuit connected to the pulse extraction unit 3 and adapted to extract a bit value of the radio signal transmitted from the transmission device Tx based on the pulse detection signal Sc output from the pulse detector 33 of the pulse extraction unit 3, and an output of the bit determination unit 4 is used in the unillustrated transmission signal information processing unit described above as a data received from the transmission device Tx. This bit determination unit 4 is provided at a subsequent stage of the pulse extraction unit 3.

In the reception device Rx constructed as above, the following operations are carried out.

FIG. 2 are charts showing signal waveforms of the respective parts in the reception device shown in FIG. 1. FIG. 2A shows a schematic waveform of the reception signal Sr obtained by receiving the radio signal transmitted from the transmission device Tx, FIG. 2B shows a time chart of transmission windows Wt, FIG. 2C shows a time chart of reception periods Wr, FIG. 2D shows a time chart of the station-transmitted signal So, and FIG. 2E shows a schematic waveform of the intermediate signal Sb. FIG. 3 are graphs showing the frequency conversion of the expander in the reception device shown in FIG. 1. FIG. 3A shows a case of mixing the reception signal Sa having the frequency f1 and the station-transmitted signal So having the frequency f2 and FIG. 3B shows a case of mixing the reception signal Sa having the frequency f1 and a station-transmitted signal So which is not a sine wave and has a basic frequency f3.

The radio signal transmitted from the transmission device Tx is composed of ultra short pulse waves of 1 ns (nanosecond) or shorter, wherein the respective ultra short pulse waves are actually burst waves as shown in FIG. 2A. A duration of this burst wave is about 2 ns, a cycle thereof is 1 ns or shorter, e.g. about several hundreds of ps, and an amplitude thereof gradually increases with passage of time and, after reaching a peak, gradually decreases with passage of time. A frequency of the ultra short pulse waves used in the UWB communication system means an inverse of the above cycle. Further, the ultra short pulse waves are transmitted from the transmission device Tx at regular time intervals set beforehand to, e.g. 30 ns or 57 ns.

In the transmission device Tx, phase information is not used to distinguish the value of the data (bit value) in this embodiment, and the presence or absence of the ultra short pulse wave in the transmission window Wt, which is a fixed time slot specified beforehand as shown in FIG. 2B, is used as the bit value. For example, the bit value is 1 when the ultra short pulse wave is present in the transmission window Wt while being 0 when the ultra short pulse wave is absent in the transmission window Wt. Alternatively, the bit value may be determined based on a level difference between detection values in a section where the pulse is present and a section where the pulse is absent using a so-called Manchester code or the like. By such operations, non-coherent communication can be carried out without using the phase information.

In the pulse extraction unit 3, the reception signal Sr output from the amplification unit 2 is processed by the expander 31 and the filter 32 before being input to the pulse detector 33. The oscillator 31a provided in the expander 31 outputs the station-transmitted signal So having a sufficiently large frequency difference from the frequency f1 of the reception signal Sr and a waveform independent of the phase and waveform of the ultra short pulse waves included in the reception signal Sr, whereby the expander 31 can output the intermediate signal Sa without depending on the respective phases of the ultra short pulse waves and the station-transmitted signal So and, hence, a simple construction is realized.

Now, it is assumed that the frequency f2 of the station-transmitted signal So output from the oscillator 31a is lower than the frequency f1 of the reception signal Sr (f1>f2). By setting the frequency f2 of the station-transmitted signal So to be lower than the frequency f1 of the reception signal Sr, there is an advantage of an easy design of the oscillator 31a as compared with the case where the frequency f2 of the station-transmitted signal So is set to be higher than the frequency f1 of the reception signal Sr. In the case of non-coherent data transmission, a phase difference between the reception signal Sr and the station-transmitted signal Sa is irrelevant. Thus, if it is assumed that the frequency of a target ultra short pulse wave is f1 and the frequency of the station-transmitted signal So is f2, focusing only on the frequencies, the intermediate signal Sa output from the expander 31 includes frequency components of frequencies (f1+f2) and (f1−f2) as shown in FIG. 3A because of the following relationships.

$$a(t) = A \cdot \sin(\omega 1 \cdot t)$$

$$b(t) = B \cdot \sin(\omega 2 \cdot t)$$

In these relationships, a(t) is the reception signal Sr, b(t) is the station-transmitted signal So, A, B are respectively the amplitude of the reception signal Sr and that of the station-transmitted signal So, and $\omega 1 = 2\pi \cdot f1$, $\omega 2 = 2\pi \cdot f2$. Since the mixer 31b for mixing the reception signal Sr and the station-transmitted signal So functions as a multiplier as described above, the intermediate signal Sa output from the mixer 31b is expressed by the following equation.

$$a(t) \cdot b(t) = (A \cdot B/2)\{\cos(\omega 1 - \omega 2)t - \cos(\omega 1 + \Omega 2)t\}$$

By extracting the frequency (f1−f2) as the lower one of these two frequency components, the frequency of the reception signal Sr is converted from the frequency f1 to a lower frequency (f1−f2) by the frequency f2. In other words, by allowing the output of the mixer 31b of the expander 31 to pass the filter 32 and setting a passband characteristic of the filter 32 in such a manner as to pass the frequency component (f1−f2) and not to pass the frequency component (f1+f2), the frequency f1 of the reception signal Sr is down-converted to the frequency (f1−f2).

Generally, if it is tried to increase a signal amplitude in a transistor, a supply current to the transistor increases to a relatively high level and consequently power consumption increases to a relatively high level as frequency increases. In this embodiment, power consumption is reduced by intermittent driving. In addition, since the frequency is lowered by the expander 31 as described above, power consumption can be reduced also during an intermittent driving period. Particularly, such a reduction of the power consumption is effective and advantageous in the case of driving the reception device Rx, for example, by a battery such as a primary battery or a secondary battery.

In the expander 31, at least one of a signal level of the station-transmitted signal So output from the oscillator 31a and that of the intermediate signal Sa output from the mixer 31b is variable in a stepwise or continuous manner. More specifically, at least one of a second amplifier 31d (shown by broken line) for amplifying the station-transmitted signal So output from the oscillator 31a and a first amplifier 31c (shown by broken line) for amplifying the intermediate signal Sa output from the mixer 31b is provided, and an amplification factor of this provided amplifier can be adjusted by a gain control signal output from the pulse detector 33. Note that, in the case of providing the both amplifiers, the respective amplification factors of the provided amplifiers can be individually adjusted by gain control signals (first gain control signal, second gain control signal) output from the pulse detector 33.

As can be understood from the above equation, the signal level (A·B/2) of the intermediate signal Sa output from the mixer 31b is changed by changing an amplitude B of the station-transmitted signal So input from the oscillator 31a to the mixer 31b. By making the signal level of the intermediate signal Sa input from the mixer 31b to the filter 32 adjustable in this way, it becomes possible to increase an SNR (signal-to-noise ratio) in a dynamic range of the pulse extraction unit 3 and prevent saturation. As a result, by optimizing the amplification factor when there is a level difference in signal level between the target ultra short pulse wave and an interference wave or unnecessary wave, the two waves can be easily separated utilizing the level difference. For example, the ultra short pulse wave and the interference wave or unnecessary wave can be separated by setting an appropriate threshold value for the signal level.

By providing the expander 31 and letting it to perform down conversion as described above, the passband characteristic of the filter 32 can be lowered to a level below the frequency f1 of the reception signal Sr. In other words, the passband characteristic can be lowered by the frequency (f1−f2) which is the frequency difference between the frequency f1 of the reception signal Sr and the frequency f2 of the station-transmitted signal So. As a result, a filter circuit having a frequency lower than the frequency f1 of the reception signal Sr (here, the frequency f1 is not a single frequency, but has a bandwidth equivalent to the passband of the filter 32) can be used as the filter 32, and the passband of the filter 32 can be lowered more than in the case where the expander 31 is not used. For example, the passband of the filter 32 can be drastically lowered. In an exemplary case where the center frequency f1 of the reception signal Sr is 4 GHz and the frequency f2 of the station-transmitted signal So is 2.6 GHz, the center frequency of the passband of the filter 32 can be lowered to 1.4 GHz.

Although the oscillator 31a of the expander 31 outputs the station-transmitted signal So in the form of a sine wave in the above description, it is not limited to the circuit for outputting the station-transmitted signal So in the form of a sine wave and the station-transmitted signal So may not be a sine wave. In the case of using this station-transmitted signal So whose waveform is not that of a sine wave, an output of the mixer 31b also includes an intermediate signal representing a frequency difference between the reception signal Sr and a high frequency component of such a station-transmitted signal So. If it is assumed that f3 denotes a basic frequency of this station-transmitted signal So, an intermediate signal including, for example, (f1−2f3), (f1−3f3), (f1−4f3), (f1+2f3), (f1+3f3) in addition to (f1−f3) and (f1+f3) as shown in FIG. 3B is output from the expander 31 in response to the frequency f1 of the reception signal Sr and the basic frequency f3 of the station-transmitted signal So. By allowing a part of the intermediate signal having desired frequencies to selectively pass the filter 32, the intermediate signal down-converted from the reception signal can be obtained as in the case of using the station-transmitted signal So in the form of a sine wave. For example, in the case of using a filter circuit, in which the center frequency of a passband is (f1−f2), as the filter 32 and extracting a part having the frequency (f1−2f3) of the intermediate signal output from the expander 31 by the filter 32, the frequency of the oscillator 31a can be lowered more than in the case of using the station-transmitted signal So in the form of a sine wave since f3=f2/2. In other words, the oscillator 31a can be more easily designed and fabricated.

With the present technology level, at or below 2 GHz, the filter 32 can be constructed using a high frequency circuit technology and electronic devices used in mobile telephones and wireless LANs. Thus, the filter 32 can be more easily designed than in the case of constructing the filter 32 whose center frequency is 4 GHz or higher without using the expander 31. Thus, the expander 31 is provided at the previous stage of the filter 32. Another circuit may be provided between the expander 31 and the filter 32. For example, the filter 32 can be constructed by a combination of a band-pass filter having a wide band of 500 MHz or more as a whole and a notch filter (band eliminate filter, band elimination filter) for attenuating a specific frequency band. Thus, the filter 32 is constructed by combining an active element with a resonance circuit.

A microstrip line and a ceramic filter are used in this resonance circuit. In the case of constructing a filter whose center frequency is 4 GHz or higher, a discrete element needs to be used as the active element. Since the passband of the filter 32 is 2 GHz or more in this embodiment, an integrated circuit such as an operational amplifier can be used as the active element. Therefore, it becomes possible to construct the filter 32 as an integrated circuit and realize miniaturization and cost reduction of the filter 32.

The filter 32 can adjust the center frequency and bandwidth of the band-pass filter and those of the notch filter by a band control signal output from the pulse detector 33. In other words, the passband of the filter 32 can be adjusted by the band control signal. For this adjustment can be employed a construction for changing the passband in a stepwise manner by providing a plurality of specified resonance circuits in the filter 32 and selecting any one of these plurality of resonance circuits by the band control signal output from the pulse detector 33. Alternatively, it is also possible to employ a construction for continuously changing the frequency by providing an electronic device, which can adjust capacitance by an external signal, for example, from a variable capacity diode, as a resonance circuit in the filter 32 and adjusting the capacitance by the band control signal output from the pulse detector 33 as the external signal.

Since the pulse detector 33 controls the passband of the filter 32 as described above, the influence of interference waves and unnecessary waves can be reduced by adjusting the passband of the filter 32 such that the frequencies of the intermediate signal Sa corresponding to the interference waves and unnecessary waves are eliminated from the passband of the filter. The interference waves and unnecessary waves can be eliminated not only by adjusting the center frequency and bandwidth of the band-pass filter, but also by adjusting the center frequency and bandwidth of the notch filter. By adjusting the passband of the filter 32 using the band control signal, the signal level of the intermediate signal corresponding to the target ultra short pulse wave can be increased to a relatively high level in the pulse detector 33.

In the reception device Rx, the reception periods Wr corresponding to the transmission windows Wt set in the transmission device Tx are set as shown in FIG. 2C. If a relationship of the presence or absence of a signal in the transmission window Wt and the bit value is specified as described above in the transmission device Tx, a bit value of 1 is output from the bit determination unit 4 in the case of receiving a radio signal in the form of an ultra short pulse wave during this set reception period Wr, and a bit value of 0 is output from the bit determination unit 4 in the case of receiving no radio wave in the form of an ultra short pulse wave during this set reception period Wr. By this operation, the data transmitted from the transmission device Tx can be extracted in the reception device Rx.

The reception period Wr in the reception device Rx may be a duration of one cycle of the ultra short pulse wave or longer. The longer the duration of the reception period Wr, the more susceptible to interference of other signals. On the other hand, the shorter the duration of the reception period Wr, the longer a period required to synchronize the transmission window Wt of the transmission device Tx and the reception period Wt of the reception device Rx. Thus, the duration of the reception period Wr set in the reception device Rx is desirably set at about 2 to 5 times as long as the transmission window Wt.

The pulse detector 33 has a function of controlling an output period of the station-transmitted signal So by controlling the oscillator 31a to output a timing control signal. By controlling the oscillator 31a, for example, to output the station-transmitted signal So only during the reception periods Wr (by controlling the oscillator 31a to operate in synchronization with the reception periods Wr) as shown in FIG. 2D by the pulse detector 33, a reception pulse P occurs in a predetermined cycle in the intermediate signal Sb generated by the passage of the target ultra short pulse wave through the filter 32. As shown in FIG. 2E this reception pulse P is generated, for example, by applying envelope detection to the intermediate signal Sb to extract an envelope using a wave detector including a square-law detector and an absolute value circuit, and is equivalent to an envelope of the ultra short pulse wave. Such an oscillator 31a does not constantly operate by being controlled by the timing control signal of the pulse detector 33, whereby power consumption of the reception device Rx is reduced.

The passband of the filter 32 is so set as to pass the intermediate signal Sa, but not to pass interference waves and unnecessary waves (hereinafter, referred to as "interference waves and the like"), and the oscillator 31a is so controlled as to output the station-transmitted station So only during the reception periods Wr as described above. By this, even in the case of receiving interference waves and the like in a frequency range of ultra short pulse waves during a period which is not the reception period Wr, the expander 31 does not convert the frequency f1 of the reception signal Sr to the passband of the filter 32. Thus, the output of the expander 31 cannot pass the filter 32 and the interference waves and the like can be eliminated from the output of the filter 32. If the interference waves and the like are received during the reception period Wr and the frequencies thereof are included in the frequency range of target ultra short pulse wave, the interference waves and the like and the target ultra short pulse wave cannot be distinguished. However, by setting the passband of the filter 32 to eliminate frequency components of the interference waves and the like confirmed to be present in a usage environment of the reception device Rx, the interference waves and the like of this type can be eliminated.

The pulse detector 33 has a function of controlling an operation period of the filter 32 by outputting a timing control signal to the filter 32. By controlling the filter 32 to output the intermediate signal Sb, which is obtained by filtering the intermediate signal Sa, only during the reception periods Wr (by controlling the filter 32 to operate in synchronization with the reception periods Wr) by the pulse detector 33, the filter 32 does not constantly operate, whereby power consumption of the reception device Rx is reduced.

The pulse detector 33 includes an integrator 33a for integrating the intermediate signal Sb output from the filter 32 during an integration period synchronized with the reception period Wr and a level determiner 33b for determining a binary level by comparing an integration value with a predetermined threshold value set beforehand and outputting a determination result, extracts the target pulses (called "target waves" below in the case of distinguishing the target ultra short pulse waves from the interference waves and the like) by discriminating the reception pulses P included in the intermediate signal Sb output from the filter 32 and the positions of the reception pulses P (arrival time discrimination), and outputs the extracted pulses as a pulse detection signal Sc to the bit determination unit 4. The integrator 33a and the level determiner 33b (or at least either one of the integrator 33a and the level determiner 33b) operate only during the reception periods Wr, whereby power consumption of the reception device Rx is reduced.

As described above, in this embodiment, the pulse detector 33 has the function of controlling the operation periods of the oscillator 31a and the filter 32 by giving the timing control signals thereto, and the oscillator 31a and the filter 32 intermittently operate in synchronization with the reception periods Wr (i.e. generation timings of the short pulses included in the reception signal Sr). Further, in this embodiment, the integrator 33a and the level determiner 33b of the pulse detector 33 also intermittently operate in synchronization with the reception periods Wr. Therefore, during the reception periods Wr, power consumption of the reception device Rx is suppressed and reduced.

In the above embodiment, the pulse detector 33 may have a function of outputting a period control signal by controlling the expander 31 to determine the reception periods Wr and a function of adjusting the frequency f2 of the station-transmitted station So by outputting a frequency control signal to the oscillator 31a in addition to the function of outputting the gain control signal to the expander 31, the band control signal to the filter 32 and the timing control signals to the oscillator 31a and the filter 32. This frequency control of the oscillator 31a is described below.

Figure 5:
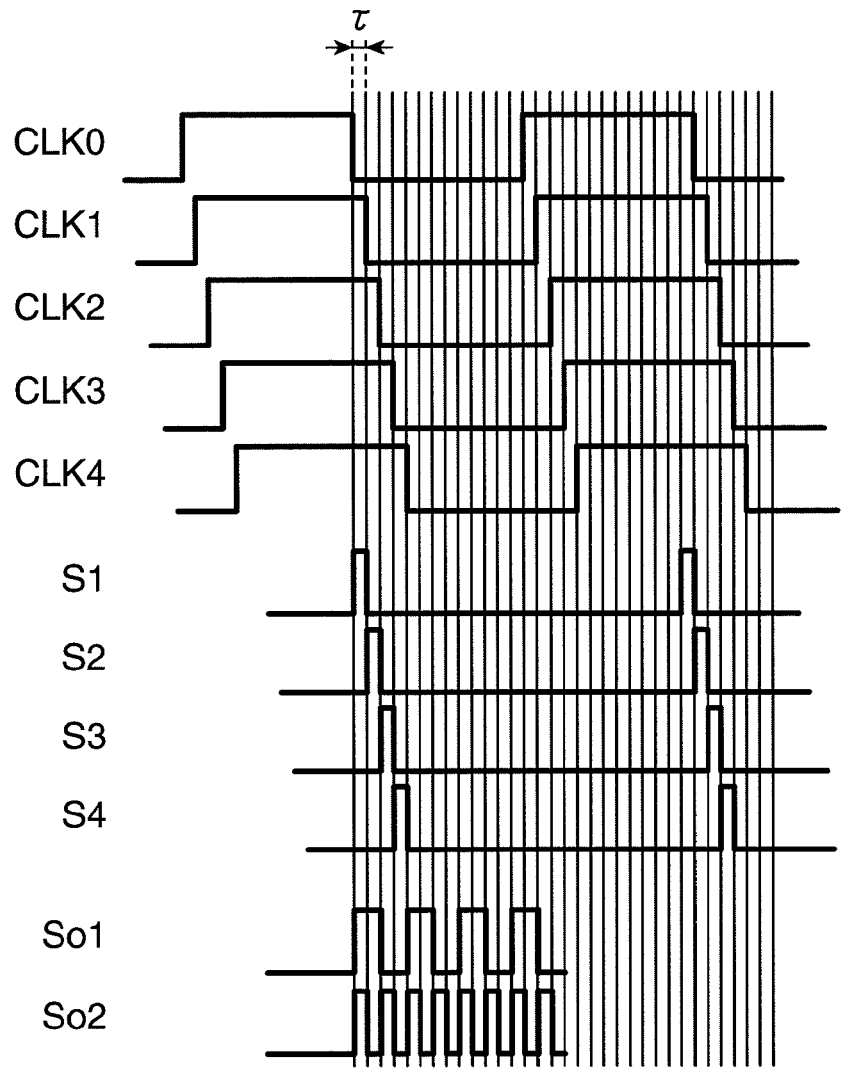
FIG. 5 is a chart showing a station-transmitted signal generated by the oscillator shown in FIG. 4.
Figure 6:
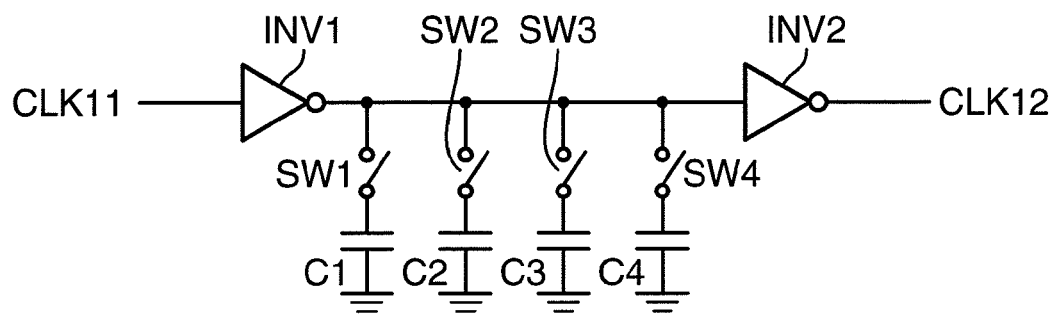
FIG. 6 is a circuit diagram showing a construction of a delay line circuit in the oscillator shown in FIG. 4, FIG. 7 are charts showing delays of clock signals generated by the delay line circuit shown in FIG. 6.

FIG. 4 is a diagram showing a construction of the oscillator in the reception device shown in FIG. 1. FIG. 5 is a chart showing the station-transmitted signal generated by the oscillator shown in FIG. 4. FIG. 6 is a circuit diagram showing a construction of a delay line circuit in the oscillator shown in FIG. 4. FIG. 7 are charts showing delays of clock signals generated by the delay line circuit shown in FIG. 6.

In FIG. 4, the oscillator 31a provided with a frequency control function includes a plurality of toggle flip-flops 1010 to 101n, a plurality of XOR elements 1021 to 102n, a plurality of AND elements 1031 to 103n, a plurality of delay line circuits 1041 to 104n, a pulse selecting circuit 105 and a delay line circuit 106. In FIG. 4 are shown five toggle flip-flops 1010 to 1014, four XOR elements 1021 to 1024, four AND elements 1031 to 1034, four delay line circuits 1041 to 1044 and the pulse selecting circuit 105.

As described later, in non-coherence communication, the reception device Rx carries out communication by the UWB communication system by synchronizing the reception periods Wr with the transmission windows Wt of the transmission device Tx. The delay line circuit 106 is a circuit for delaying a clock signal to delay a rise timing of the clock signal in order to adjust a start timing of the reception period Wr.

A clock signal CLK is input from an unillustrated clock generator to the toggle flip-flop 1010 via the delay line circuit 106, and the toggle flip-flop 1010 outputs a clock signal CLK0 generated in accordance with the clock signal CLK to the XOR 1021.

The clock signal CLK is input from the unillustrated clock generator to the toggle flip-flop 1011 via the delay line circuits 106 and 1041, and the toggle flip-flop 1011 outputs a clock signal CLK1 generated in accordance with an output of the delay line circuit 1041 to the XOR element 1021, the AND element 1031 and the XOR element 1022. The clock signals CLK0, CLK1 are input to the XOR element 1021, and the XOR element 1021 outputs an exclusive OR of the clock signals CLK0 and CLK1 to the AND element 1031. The clock signal CLK1 and the output of the XOR element 1021 are input to the AND element 1031, and the AND element 1031 outputs an AND of the clock signal CLK1 and the output of the XOR element 1021 as a signal S1 to the pulse selecting circuit 105.

The clock signal CLK is input from the unillustrated clock generator to the toggle flip-flop 1012 via the delay line circuits 106, 1041 and 1042, and the toggle flip-flop 1012 outputs a clock signal CLK2 generated in accordance with the output of the delay line circuit 1042 to the XOR element 1022, the AND element 1032 and the XOR element 1023. The clock signals CLK1 and CLK2 are input to the XOR element 1022, and the XOR element 1022 outputs an exclusive OR of the clock signals CLK1 and CLK2 to the AND element 1032. The clock signal CLK2 and the output of the XOR element 1022 are input to the AND element 1032, and the AND element 1032 outputs an AND of the clock signal CLK2 and the output of the XOR element 1022 as a signal S2 to the pulse selecting circuit 105.

The clock signal CLK is input from the unillustrated clock generator to the toggle flip-flop 1013 via the delay line circuits 106, 1041, 1042 and 1043 and the toggle flip-flop 1012 outputs a clock signal CLK3 generated in accordance with the output of the delay line circuit 1043 to the XOR element 1023, the AND element 1033 and the XOR element 1024. The clock signals CLK2 and CLK3 are input to the XOR element 1023, and the XOR element 1023 outputs an exclusive OR of the clock signals CLK2 and CLK3 to the AND element 1033. The clock signal CLK3 and the output of the XOR element 1023 are input to the AND element 1033, and the AND element 1033 outputs an AND of the clock signal CLK3 and the output of the XOR element 1023 as a signal S3 to the pulse selecting circuit 105.

The clock signal CLK is input from the unillustrated clock generator to the toggle flip-flop 1014 via the delay line circuits 106, 1041, 1042, 1043 and 1044 and the toggle flip-flop 1014 outputs a clock signal CLK4 generated in accordance with the output of the delay line circuit 1044 to the XOR element 1024, the AND element 1034 and the unillustrated XOR element 1025. The clock signals CLK3 and CLK4 are input to the XOR element 1024, and the XOR element 1024 outputs an exclusive OR of the clock signals CLK3 and CLK4 to the AND element 1034. The clock signal CLK4 and the output of the XOR element 1024 are input to the AND element 1034, and the AND element 1034 outputs an AND of the clock signal CLK4 and the output of the XOR element 1024 as a signal S4 to the pulse selecting circuit 105.

As described above, in the oscillator 31a, the clock signal CLK is input from the unillustrated clock generator to the toggle flip-flop 101n successively via the delay line circuits 106, 1041 to 104n−1, and the toggle flip-flop 101n outputs the clock signal CLKn generated in accordance with the output of the delay line circuit 104n-1 to the XOR element 102n, the AND element 103n and the XOR element 102n+1. The clock signals CLKn-1 and CLKn are input to the XOR element 102n, and the XOR element 102n outputs an exclusive OR of the clock signals CLKn-1 and CLKn to the AND element 103n. The clock signal CLKn and the output of the XOR element 102n are input to the AND element 103n, and the AND element 103n outputs an AND of the clock signal CLKn and the output of the XOR element 102n as a signal Sn to the pulse selecting circuit 105.

Specifically, the oscillator 31a is cascade-connected to a plurality of signal generating circuits 100 each comprised of the toggle flip-flop 101, the XOR element 102, the AND element 103 and the delay line circuit 104 and adapted to generate a signal S. In the signal generating circuit 100k, the output of the delay line circuit 101k-1 in the signal generating circuit 100k-1 at the previous stage is input to the delay line circuit 101k. The output of the delay line circuit 101k is respectively input to the toggle flip-flop 101k and the delay line circuit 104k+1 in the signal generating circuit 100k+1 at the subsequent stage. The toggle flip-flop 101k generates a clock signal CLKk in accordance with the output of the delay line circuit 101k and outputs this clock signal CLKk respectively to the XOR element 102k and the XOR element 102k in the signal generating circuit 101k+1 at the subsequent stage. The XOR element 102k outputs an exclusive OR of the output of the toggle flip-flop 101k-1 in the signal generating circuit 101k-1 at the previous stage (clock signal CLKk-1 in the signal generating circuit 101k-1 at the previous stage) and the output of the toggle flip-flop 101k (clock signal CLKk in the signal generating circuit 101k at this stage) to the AND element 103k. The AND element 103k outputs an AND of the output of the toggle flip-flop 101k and that of the XOR element 102k as a signal Sk to the pulse selecting circuit 105. Note that, in the signal generating circuit 1001 at the first stage, a clock signal CLK is input from the unillustrated clock generator to the delay line circuit 1041 via the delay line circuit 106, and a clock signal CLK0 is generated in accordance with the clock signal CLK generated by the clock generator and delayed by the delay line circuit 106 in the toggle flip-flop 1010 and output to the XOR element 1021.

Preset signals and presets are appropriately input to the respective toggle flip-flops 1010 to 101n.

The pulse selecting circuit 105 generates a station-transmitted signal So having a desired waveform (or frequency) by combining the respective waveforms of the signals S1 to Sn based on a frequency control signal output from the pulse detector 33. FIG. 5 shows the clock signals CLK0 to CLK4, the signals S1 to S4 and the station-transmitted signals So1, So2 in this order from top to bottom. The clock CLK0 shown in FIG. 5 is a signal via the delay line circuit 106. The station-transmitted signals So1, So2 are examples of the station-transmitted signal So generated by the oscillator 31a shown in FIG. 4. There are delay times τ between the clock signals CLK0 to CLKn caused by the delay line circuits 1041 to 104n. In other words, the delay times of the respective delay line circuits 1041 to 104n are time τ and the clock signal CLKn is a delayed clock signal from the clock signal CLKn-1 at the previous stage and delayed by the delay time τ with respect to the clock signal CLKn-1. In the oscillator 31a shown in FIG. 4, the signals S1 to Sn are pulses whose pulse widths are the delay time τ and which are successively shifted by the delay time τ as shown in FIG. 5. Accordingly, for example, by using two out of every four of the signals S1 to Sn, a pulsed station-transmitted signal So1 whose pulse width is 2×τ and whose cycle is 4×τ is generated. Further, for example, by using one out of every two of the signals S1 to Sn, a pulsed station-transmitted signal So2 whose pulse width is τ and whose cycle is 2×τ is generated.

For example, as shown in FIG. 6, the delay line circuit 104 (1041 to 104n) includes two inverter elements INV1, INV2 and one or more series circuits each comprised of a capacitor C and a switch SW, an output of one inverter element INV1 is connected to an input of the other inverter element INV2 and the one or more series circuits are connected between the output of the inverter element INV1 and a ground level. In the example shown in FIG. 6, four series circuits (capacitors C1 to C4, switches SW1 to SW4) are connected. The switches SW1 to SW4 of the respective series circuits are on/off controlled by the frequency control signal output from the pulse detector 33. Capacitance connected to the output of the inverter element INV1 is changed by the on/off control of the switches SW1 to SW4, whereby the delay time τ (see FIG. 5) caused by the capacitance occurs between a clock signal CLK11 input to the delay line circuit 104 and a clock signal CLK12 output from the delay line circuit 104. In the example shown in FIGS. 6 and 7, the capacitances of the respective capacitors C1 to C4 are respectively set at C, 2C, 4C and 8C so that capacitances of 0, C, 2C, 3C, . . . , 15C can be obtained. For example, when only the switch SW1 is on, the clock signal CLK12 output from the delay line circuit 104 becomes a clock signal CLK121 shown in FIG. 7B and delayed by a delay time τ1 with respect to the clock signal CLK11 shown in FIG. 7A. For example, when only the switch SW2 is on, the clock signal CLK12 output from the delay line circuit 104 becomes a clock signal CLK122 shown in FIG. 7C and delayed by a delay time τ2 (=2×τ1) with respect to the clock signal CLK11. For example, when only the switch SW3 is on, the clock signal CLK12 output from the delay line circuit 104 becomes a clock signal CLK123 shown in FIG. 7D and delayed by a delay time τ3 (=4×τ1) with respect to the clock signal CLK11.

The pulse selecting circuit 105 combines the respective waveforms of the signals S1 to Sn and controls the delay times τ of the delay line circuits 104 based on the frequency control signal output from the pulse detector 33 in this way, whereby the waveform and the f2 of the station-transmitted signal So are arbitrarily controlled. The oscillator 31a is constructed by a relatively simple circuit as shown in FIG. 4 and can reduce its power consumption. Further, since the frequency of the station-transmitted signal So can also be adjusted according to the frequency of a transmission signal, transmission signals having a plurality of different frequencies can be dealt with.

In the above embodiment, the oscillator 31a may be constructed using a PLL (Phase-Locked Loop) circuit. FIG. 8 is a block diagram showing a construction of a PLL circuit usable in the oscillator in the reception device shown in FIG. 1. The PLL circuit generally includes a series circuit comprised of a phase comparator 111, a charge pump 112, a loop filter 113 and a voltage control oscillator 114, and a frequency divider 115 disposed in a feedback path from an output of the voltage control oscillator 114 to the phase comparator 111 as shown in FIG. 8. In the case of use in the oscillator 31a, the output of the voltage control oscillator 114 serves as the station-transmitted signal So. A general PLL circuit can be used in the oscillator 31a by constructing the delay line circuits 104 by at least a part of the PLL circuit, which is advantageous in terms of cost. Besides the PLL circuit, the oscillator 31a may also be constructed using a DLL (Delay-Locked Loop) circuit and an FLL Frequency-Locked Loop) circuit.

Since the frequency f2 of the station-transmitted signal So output from the oscillator 31a is adjustable as described above, it can be so adjusted that intermediate signals such as interference waves are outside the passband of the filter 32, thereby increasing a possibility of being able to eliminate interference waves and the like by such an adjustment. In other words, the influence of the interference waves and the like can be reduced. Further, in the pulse detector 33, it is also possible to adjust the frequency f2 of the station-transmitted signal So so that the signal levels of the intermediate signals corresponding to the target wave increase. It is desirable to link and control the frequency control signal to the oscillator 31a and the aforementioned band control signal to the filter 32. Particularly, since the center frequency of the notch filter for eliminating the interference waves and the like needs to match the intermediate signals relating to the interference waves, it is desirable to link the frequency control signal and the band control signal.

Here, as can be understood from the above description, a technology for setting the reception periods Wr in accordance with the target waves to separate the interference waves and the like from the target waves, a technology for separating a frequency band where the interference waves and the like are present from the target waves and a technology for separating the interference waves and the like based on level differences in signal level between the interference waves and the like and the target waves are used in combination to separate the interference waves and the like from the target waves in the pulse extraction unit 3 of this embodiment. In other words, in the pulse extraction unit 3, by limiting the periods during which the target waves are extracted from the reception signal Sr, power consumption of the reception device Rx is reduced, interference waves and the like generated at a time different from the target waves are eliminated and interference waves and the like generated substantially at the same time as the target waves are eliminated utilizing differences in frequency components and level differences in signal level.

Although the interference waves and the like are physically eliminated in the pulse extraction unit 3, they are not necessarily completely eliminated. Thus, the output of the pulse extraction unit 3 is logically judged by the bit determination unit 4 and, if the bit value extracted by the pulse extraction unit 3 is incorrect, the corresponding data is discarded. Whether the bit value is correct or incorrect may be confirmed by inserting a bit synchronization pulse train SB (see FIG. 9) before a data when a radio signal is transmitted from the transmission device Tx and verifying the bit synchronization pulse train SB in the reception device Rx (bit determination unit 4). Whether the bit value is correct or incorrect can also be confirmed by using a code error detection technology such as so-called check sum in the bit determination unit 4. In the case of discarding the data, a known communication process such as a retransmission request is performed.

As can be understood from the above, the reception device Rx needs to synchronize the reception periods Wr with the transmission windows Wt of the transmission device Tx. Here, a function of the pulse detector 33 to determine start timings of the reception periods Wr is more specifically described. FIGS. 9A and 9B are charts showing a frame configuration in a radio signal of the UWB communication system.

The reception period Wr is, for example, so determined as to match a timing at which the transmission device Tx generates the target wave and a timing at which the reception device Rx causes the oscillator 31a to generate the station-transmitted signal So. A state where these two timings match is equivalent to a synchronous operation of the transmission device Tx and the reception device Rx in transmission and reception of a communication signal of the UWB communication system. In order to synchronize the transmission device Tx and the reception device Rx, one frame of the radio signal transmitted from the transmission device Tx includes, for example, a synchronization pulse train SY as shown in FIG. 9A. As described above, the bit synchronization pulse train SB used in the bit determination unit 4 is also included in the frame. A data pulse train DT is included after these synchronization pulse train SY and bit synchronization pulse train SB in the frame. On the other hand, the pulse detector 33 of the reception device Rx sets the timings of the reception periods Wr so as to synchronize with the transmission device Tx using the synchronization pulse train SY shown in FIG. 9B.

Ultra short pulse waves are used for this synchronization pulse train SY as shown in FIG. 9B similar to the data pulse train DT. In the data pulse train DT, the bit value is expressed based on the presence or absence of a train of the ultra short pulse waves in the transmission window Wt. On the other hand, in the synchronization pulse train SY, the ultra short pulse waves are generated at regular intervals so that a train of the ultra short pulse waves is present in all the transmission windows Wt.

During a generation period of the synchronization pulse train SY, the pulse detector 33 operates in a search mode for searching the start timings of the reception periods Wr. In this search mode, a time interval at which the reception periods Wr are provided is changed to detect a reception timing of the synchronization pulse train SY. This time interval is set to be shorter than the time interval at which the transmission windows Wt are generated. For example, the time intervals at which the reception periods Wr are provided are changed every time. By appropriately setting the number of the synchronization pulse trains SY and the time interval of the reception periods Wr, the ultra short pulse waves included in the synchronization pulse train SY are frequency-converted in any one of the reception periods Wr during the reception of the synchronization pulse train SY, and an intermediate signal Sb corresponding to the ultra short pulse waves is obtained from the filter 32. The pulse detector 33 compares an integration value of the intermediate signal Sb (see FIG. 2E) output from the filter 32 with a predetermined threshold value and eliminates the intermediate signal, whose signal level has not reached the predetermined threshold value, as an interference wave or the like.

In the presence of a system (apparatus) for transmitting a radio signal besides the transmission device Tx, the pulse detector 33 may further include an interference wave detector for detecting interference waves and the like generated by this system from an intermediate signal whose integration value has not reached the predetermined value, and outputting an interference wave detection signal. This enables discrimination of the target ultra short pulse waves and the interference waves and the like.

When the ultra short pulse waves included in the synchronization pulse train SY are detected during any one of the reception periods Wr while the synchronization pulse train SY is being generated, the pulse detector 33 transitions from the search mode to a data mode for obtaining data and the time interval of the reception periods Wr after this reception period Wr is switched to the one substantially matching the time interval at which the transmission windows Wt are generated in the transmission device Tx. By this operation, the transmission device Tx and the reception device Rx can be synchronized. In the data mode, the pulse detector 33 compares the integration value in each reception period Wr with the threshold value and outputs a magnitude relation of the integration value and the threshold value as a pulse detection signal Sc. For example, the pulse detection signal Sc composed of a signal corresponding to the bit value of 1 is output if the integration value is equal to or larger than the threshold value, and the pulse detection signal Sc composed of a signal corresponding to the bit value of 0 is output if the integration value is smaller than the threshold value.

In this way, the pulse detector 33 discriminates the positions of the pulse matching the reception period Wr, i.e. discriminates the generation timing of the transmission window Wt by the transmission device Tx in the search mode and discriminates the presence or absence of the pulse at this position in the data mode. Note that this position is a position on a time axis (temporal position).

As described above, the pulse detector 33 normally operates in the search mode in which the time interval of the reception periods Wr is changed, and operates in the data mode in which the reception periods Wr match the time interval at which the transmission windows Wt are generated until one frame of the radio signal transmitted from the transmission device Tx is completed when the ultra short pulse wave is detected in any one of the reception periods Wr in the search mode. The completion of one frame of the radio signal is judged, for example, by detection of a sequence indicating the end of the frame and notification of the completion of the frame from the bit determination unit 4. Alternatively, this completion is judged, for example, when a state where no pulse detection signal Sc is generated continues for a predetermined period. Since the reception periods Wr differ in the search mode and the data mode, at least either the timings of the driving periods (oscillation periods, reception periods Wr) in the oscillator 31a or the duration of the driving periods is controlled by giving the timing control signal to the expander 31.

The bit determination unit 4 does not operate until the ultra short pulse wave is detected in the search mode, and stops its operation again after performing a determination operation until one frame of the radio signal is completed following the detection of the ultra short pulse wave. Since the bit determination unit 4 operates only when necessary as described above, power consumption of the reception device Rx can be reduced.

Each of the transmission device Tx and the reception device Rx includes an unillustrated timer for measuring at least the time interval, and both timers have such accuracy that errors can be ignored within a period required for transmission of one frame. In the non-coherent UWB communication system, it is sufficient to extract the target waves in the pulse detector 33 and not necessary to use all the intermediate signals Sb having passed the filter 32. Thus, high stability is not required for frequencies of the intermediate signals Sb. Therefore, high stability is also not required for the frequency f2 of the station-transmitted signal So output from the oscillator 31a, and the oscillator 31a can be more easily designed in this respect as well.

Next, another embodiment is described.

Second Embodiment

Figure 10:
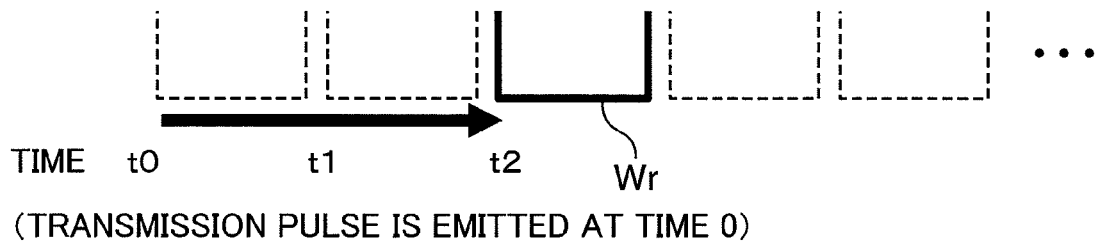
FIG. 10 is a chart showing an object detecting operation of a reception device according to a second embodiment, FIG. 11 are diagrams showing an object detecting operation taking into account multipaths of the reception device according to the second embodiment.
Figure 11A:
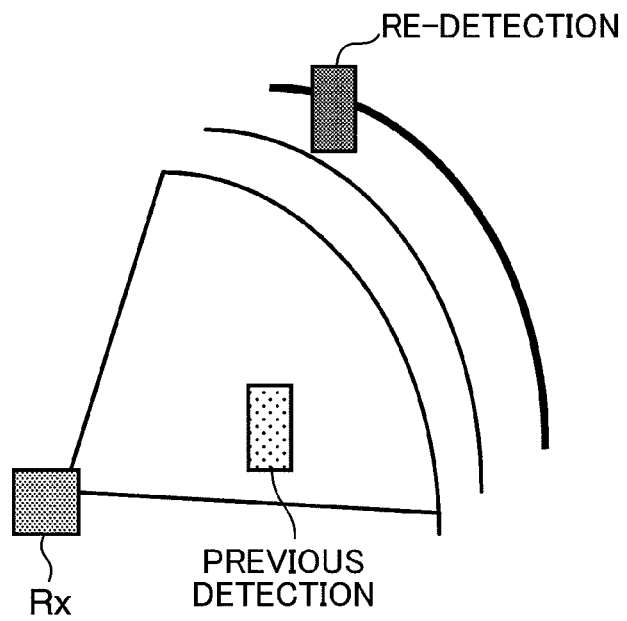
Figure 11B:
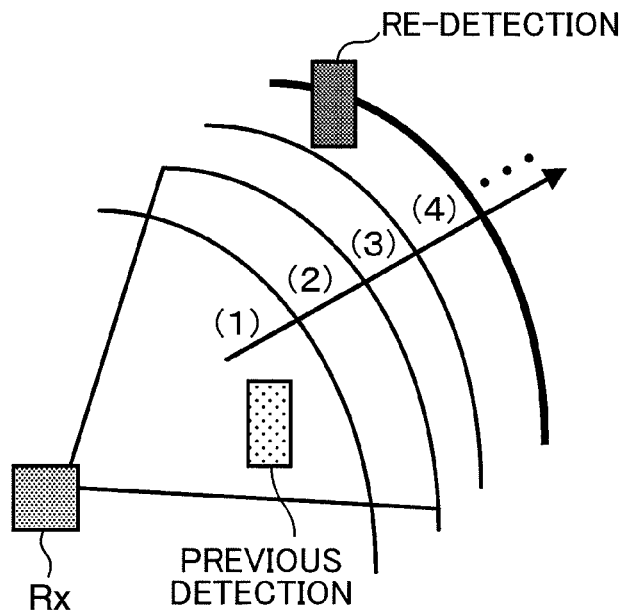

FIG. 10 is a chart showing an object detecting operation of a reception device according to a second embodiment. FIG. 11 are diagrams showing an object detecting operation taking into account multipaths of the reception device according to the second embodiment, wherein FIG. 11A is the diagram showing object detection by the multipaths and FIG. 11B is the diagram showing a scanning method of the reception device Rx.

The reception device Rx of the second embodiment is a device in which short pulse waves arranged at regular time intervals are used as a transmission signal of a UWB system instead of a communication signal used to transmit a data in a non-coherent manner and a distance to an object based on a time difference between a transmitted wave and a reflected wave and a motion of the object based on a temporal intensity variation of the reflected wave are detected by receiving the reflected wave of a radio signal (short pulse waves) transmitted from a transmission device Tx for transmitting the transmission signal and reflected by the object. Such a reception device Rx of the second embodiment includes a hardware construction substantially similar to the reception device Rx of the first embodiment and the operation of the hardware construction differs in the following points.

Specifically, when the transmission device Tx transmits short pulse waves at the regular time intervals (short pulse wave transmission intervals), the reception device Rx of the second embodiment scans reception periods Wr (integration start timings of an integrator 33a) by successively shifting them by a predetermined time interval as shown in FIG. 10, compares the respective integration values of the integrator 33a in the respective reception periods Wr obtained by this scanning and a predetermined threshold value (object detection threshold value), and calculates a distance to an object based on the elapse of time from an emission timing of the short pulse wave corresponding to the reception period Wr, which gives the integration value of the integrator 33a equal to or larger than the predetermined threshold value (object detection threshold value), as a result of this comparison. For example, if the emission timing of the short pulse wave is set at time 0 as shown in FIG. 10, a distance L to an object can be calculated by L=C·t/2 if C denotes light speed when the integration value of the integrator 33a in the reception period Wr at time T2 is equal to or larger than the predetermined threshold value.

The reception device Rx of the second embodiment can also measure the integration value of the integrator 33a in one certain reception period Wr a plurality of times by the pulse detector 33 and detect whether or not the object is in motion based on a variance value of the respective integration values obtained by the respective measurements. In other words, the reception device Rx of the second embodiment further includes the pulse detector 33 for discriminating a target pulse and its arrival time based on the intermediate signal and outputting a pulse detection signal, and an unillustrated object motion detector for detecting whether or not the object is in motion based on the pulse detection signal output from the pulse detector 33. The pulse detector 33 receives a reflected wave from the object a plurality of times at the arrival time when the target pulse is discriminated and outputs reception intensities as the pulse detection signal, and the object motion detector detects whether or not the object is in motion based on the variance value of the respective reception intensities obtained by receiving the reflected wave a plurality of time. By such a construction, whether or not the object is in motion can be more accurately detected.

Generally, when a target object is perfectly stationary, short pulse waves emitted from the transmission device Tx are constantly incident on the object and neighboring stationary objects in a substantially similar manner. Thus, reception intensities of the reflected waves received by the reception device Rx are substantially constant. Therefore, the variance value of the respective integration values of the integrator 33a during one certain reception period Wr is relatively small. In the case of this embodiment, dispersion of power intensities of the reflected waves is detected. This dispersion is induced by an amplitude intensity variation of synthetic waves generated by simultaneously receiving reflected waves from neighboring stationary objects and reflected waves from detailed parts of the object in motion. Accordingly, if there is an object that is in motion of even a tremor level, short pulse waves emitted from the transmission device Tx are incident on the respective detailed parts of the moving object in different manners from moment to moment, wherefore the intensities of the received synthetic waves fluctuate and the variance value of the respective integration values of the integrator 33a during the one certain reception period Wr becomes relatively larger. Thus, the reception device Rx of the second embodiment can first preliminarily detect the object by the above operation using the object detection threshold value, measure the integration value of the integrator 33a a plurality of times during the reception period Wr during which the object was detected, compare the variance value of the respective integration values obtained by the respective measurements and the predetermined threshold value (object motion detection threshold value) and judge that the object detected using this object motion detection threshold value is in motion when the variance value is equal to or larger than the predetermined threshold value (object motion detection threshold value) as a result of this comparison.

In order to detect the object and the object motion at once, the reception device Rx may be so constructed that the integration value of the integrator 33a is measured a plurality of N times during each reception period Wr. Although depending on emission intensities of the short pulse waves emitted from the transmission device Tx, the distance to the object, reflection characteristics of the object, etc., the intensities of the reflected waves from the object are normally low. Thus, in order to obtain one integration value in the integrator 33a, the reception device Rx may be so constructed that integration is performed a plurality of K times in the integrator 33a to measure the integration value of the integrator 33a during one reception period Wr while the transmission device Tx is transmitting the short pulse wave a plurality of K times. Therefore, the transmission device Tx transmits the short pulse wave a plurality of N×K times in the case of performing the measurement a plurality of N times and the integration a plurality of K times.

As described above, the transmission device Tx and the reception device Rx in the second embodiment build an object detection system for detecting a distance to an object and a motion of the object by an active method.

In such a system that detects an object in a non-coherent manner, it is difficult for the reception device Rx to distinguish the integration value of the integrator 33a obtained by directly receiving the reflected wave and the integration value of the integrator 33a obtained by receiving the reflected wave by the multipaths since detection is made based on the intensity of the reflected wave from the object. In other words, it is difficult for the reception device Rx to distinguish the integration value of the integrator 33a obtained when the short pulse wave emitted from the transmission device Tx is directly incident on the object and reflected thereby and this reflected wave is directly received by the reception device Rx and the integration value of the integrator 33a obtained when the short pulse wave emitted from the transmission device Tx is incident on one or more other objects and reflected again a plurality of times after being reflected by the object until being received by the reception device Rx. Thus, in the above object detecting operation, the object (previous detection) detected based on the integration value of the integrator 33a obtained by directly receiving the reflected wave is detected again as a ghost by the multipaths as shown in FIG. 11A.

Thus, the reception device Rx of the second embodiment may be so constructed as to successively perform object detection in a direction away from the reception device Rx as shown by (1), (2), (3), (4), . . . in FIG. 11B, i.e. from an area near the reception device Rx toward an area distant from the reception device Rx and measure a distance to the object and a motion of the object when the object is first detected. Alternatively, the reception device Rx of the second embodiment may be so constructed as to successively perform object detection in a direction toward the reception device Rx as shown by . . . (4), (3), (2), (1) in FIG. 11B, i.e. from the area distant from the reception device Rx toward the area near the reception device Rx and measure a distance to the object and a motion of the object when the object is first detected. By such constructions, the reception device Rx can reduce the influence of the multipaths and more accurately measure the distance to the object and the motion of the object. Particularly, since a relatively large number of reflecting bodies are present indoors, such an object detecting operation taking into account the multipaths is useful.

By operating as described above, the reception device Rx of the second embodiment can detect a distance to an object based on a time difference between a transmitted wave and a reflected wave and a motion of the object based on a temporal intensity variation of the reflected wave.

Next, another embodiment is described.

Third Embodiment

Figure 12:
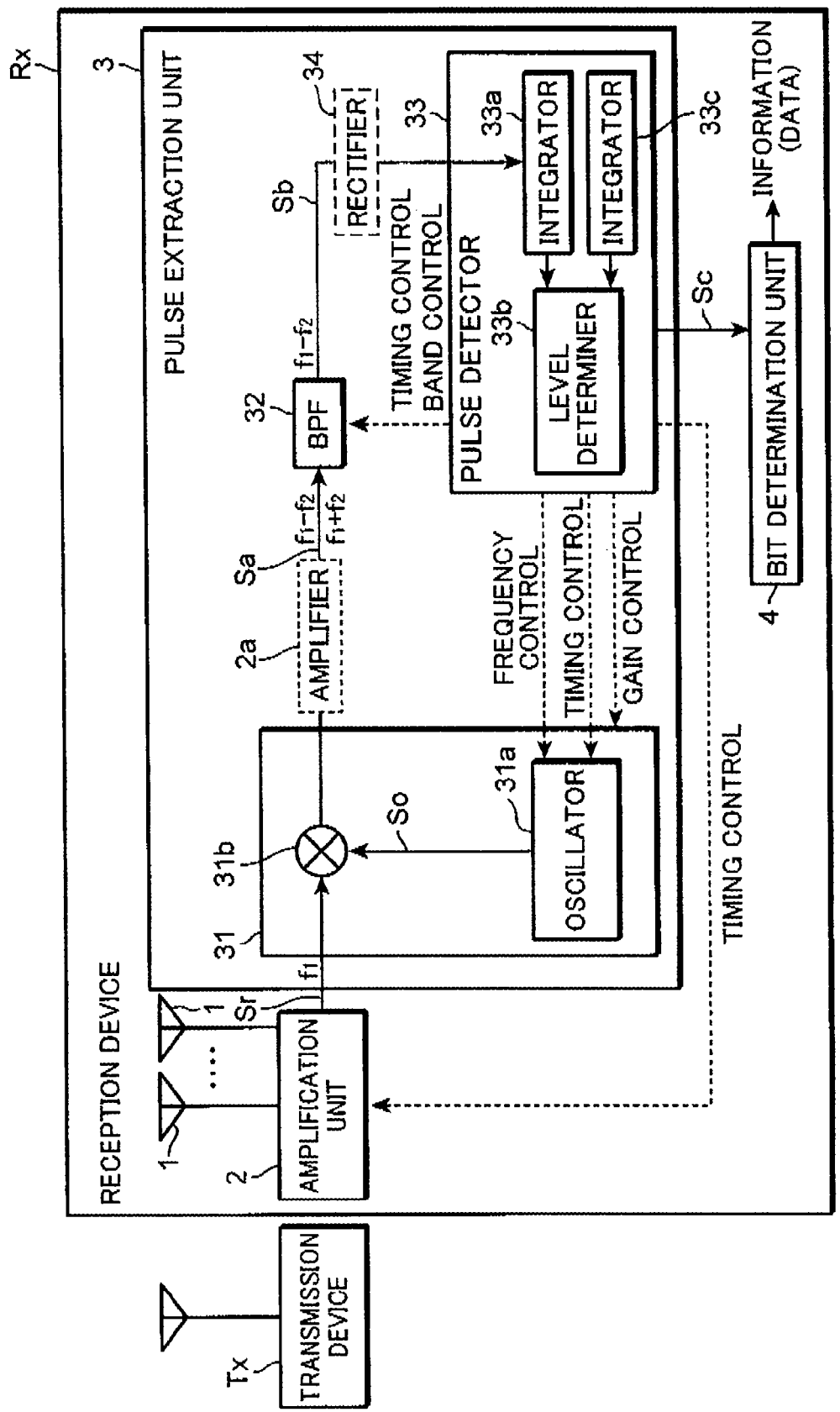
FIG. 12 is a block diagram showing a construction of a reception device according to a third embodiment, FIG. 13 are charts showing signal waveforms of respective parts in the reception device shown in FIG. 10.
Figure 13:
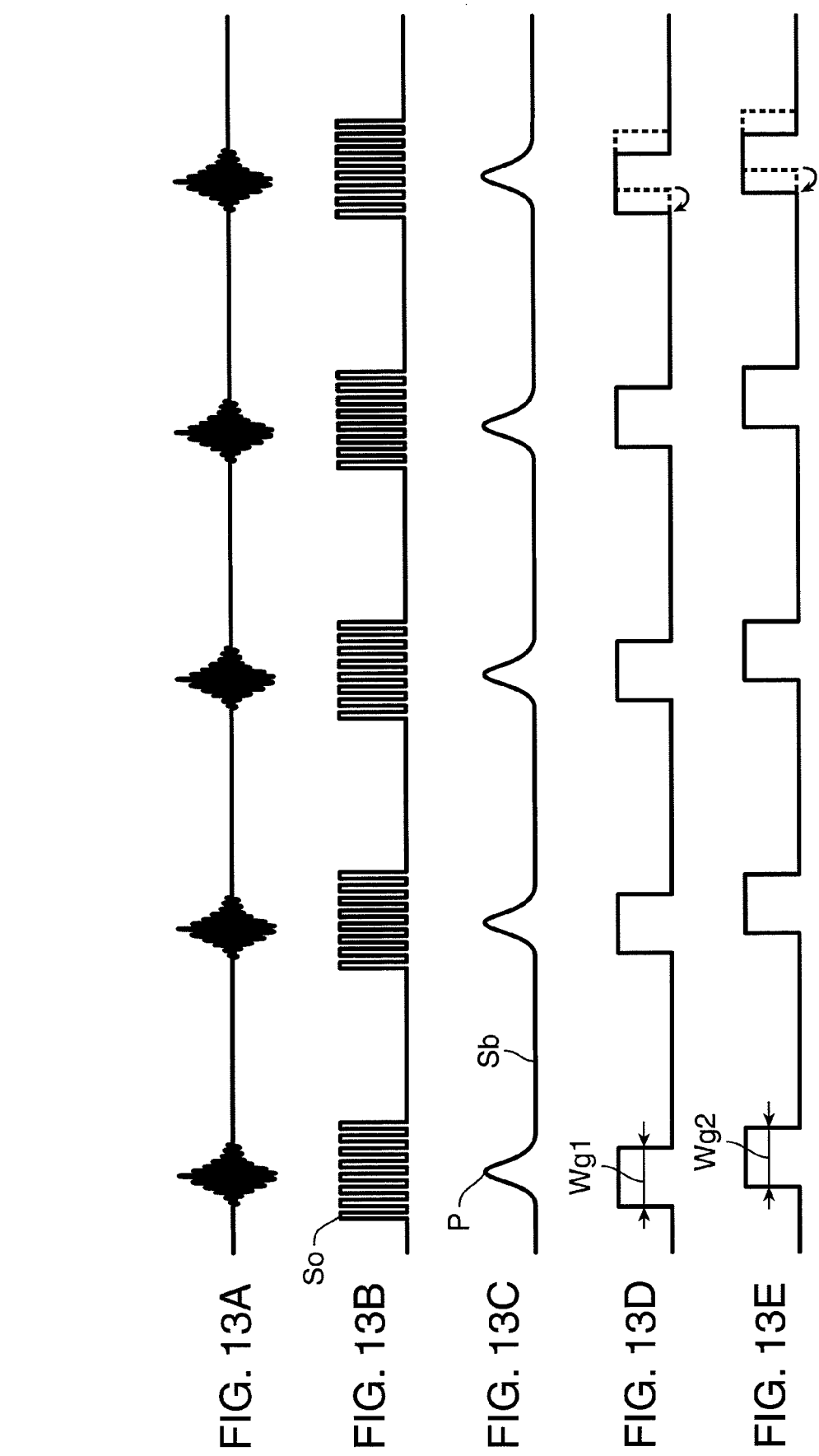

FIG. 12 is a block diagram showing a construction of a reception device according to a third embodiment. FIG. 13 are charts showing signal waveforms in respective parts of the reception device shown in FIG. 12.

The reception device Rx of the third embodiment is a device in which short pulse waves arranged at regular time intervals are used as a transmission signal of a UWB system instead of a communication signal used to transmit a data in a non-coherent manner and a distance to an object based on a time difference between a transmitted wave and a reflected wave and a motion of the object based on a temporal intensity variation of the reflected wave are detected by receiving the reflected wave of a radio signal (short pulse waves) transmitted from a transmission device Tx for transmitting the transmission signal and reflected by the object, and has, for example, a construction shown in FIG. 12. In other words, the reception device Rx of the third embodiment shown in FIG. 12 differs from the reception device Rx of the first embodiment shown in FIG. 1 in that the pulse detector 33 includes an integrator 33c in addition to the integrator 33a. Note that a construction similar to the first embodiment is denoted by the same reference numerals and not described. The reception device Rx of the third embodiment may be constructed integrally to the transmission device Tx.

The pulse detector 33 of the third embodiment includes two integrators 33a, 33c. Integration periods Wg1, Wg2, for example, shown in FIGS. 13D and 13E are respectively set at different timings for these integrators 33a, 33c, and an intermediate signal Sb output from a filter 32 is integrated during the respective integration periods Wg1, Wg2. The timings of the integration periods Wg1, Wg2 of the integrators 33a, 33c are so changed that two integration values are equal in a range where at least one of the respective integration values obtained during the two integration periods Wg1, Wg2 is equal to or larger than a threshold value (see arrows in FIG. 13E), and a reception period Wr and a reception pulse P (target ultra short pulse wave) shown in FIG. 13C are synchronized by setting the center of a combined period of the two integration periods Wg1, Wg2 at the center of the reception period Wr. FIG. 13A shows the waveform of a reception signal Sr obtained by receiving a radio signal transmitted from the transmission device Tx, and FIG. 13B show a station-transmitted signal So output from an oscillator 31a. The station-transmitted signal So is output only during the reception periods Wr.

Since the reception periods Wr and the reception pulses P are synchronized using the two integrators 33a, 33c in this way, a distance to an object in motion and a motion of the object can be accurately detected. Further, even if there is an error between a reference frequency of the transmission device Tx and that of the reception device Rx, the reception periods Wr and the reception pulses P can be synchronized. Generally, a frequency deviation of a crystal oscillator used to generate a reference frequency is about ±10 ppm ($=10 \times 10^{-6}$) and is about 20±0.0002 MHz when the reference frequency is 20 MHz.

By using the two integrators 33a, 33c in this way, whether the object is near or distant and a moving direction of the object can be detected by comparing the integration value of the integrator 33a during the integration period Wg1 and that of the integrator 33c during the integration period Wg2, wherefore the distance to the object and the motion of the object can be more accurately detected. For example, when transmission intervals of the short pulse waves and the reception periods Wr are constant and the integration of the integrator 33c is started later than that of the integrator 33a, an actual distance to the object is shorter than the distance to the object calculated based on the reception period Wr of the integration period Wg2 and the object can be judged to be closer to the reception device Rx than calculated if the integration value of the integrator 33a during the integration period Wg1 is larger than that of the integrator 33c during the integration period Wg2 at a certain time. On the other hand, if the integration value of the integrator 33a during the integration period Wg1 is, conversely, smaller than that of the integrator 33c during the integration period Wg2 at a certain time, an actual distance to the object is longer than the distance to the object calculated based on the reception period Wr of the integration period Wg1 and the object can be judged to be more distant from the reception device Rx than calculated. Further, the moving direction of the object can be detected by comparing the above magnitudes with time. For example, when the transmission intervals of the short pulse waves and the reception periods Wr are constant and the integration of the integrator 33c is started later than that of the integrator 33a, the object being detected can be judged to be moving in a direction away from the reception device Rx if the integration value of the integrator 33a during the integration period Wg1 is larger than that of the integrator 33c during the integration period Wg2 at a certain time and the integration value of the integrator 33a during the integration period Wg1 is smaller than that of the integrator 33c during the integration period Wg2 at another time after the elapse of a predetermined time from the certain time. On the other hand, in a case contrary to the above, the object being detected can be judged to be moving in a direction toward the reception device Rx. As described above, the reception device Rx includes two integrators 33a, 33c and can detect a distance to an object and a moving direction of the object in motion by shifting the integration start timings of the respective integrators 33a, 33c from each other for one certain reception period Wr.

In the above third embodiment, the reception device Rx may include a plurality of pulse detectors 33 and may be so constructed that the integration start timings of the respective integrators 33a in the respective pulse detectors 33 are shifted from each other by a predetermined time set beforehand. According to this construction, the integrator 33 that gives a largest integration value can be searched by comparing the respective integration values of the respective integrators 33a, and a peak time of the reception signal can be more accurately detected and a distance to an object and the like can be more accurately detected by using the integration start timing in the integrator 33 that give this largest integration value.

In the above second and third embodiments, the reception device Rx may be constructed integrally to the transmission device Tx. Specifically, the reception device Rx further includes a transmission unit for transmitting a transmission signal and an oscillator 31a of an expander 31 outputs a station-transmitted signal So to a mixer 31b and a frequency signal corresponding to the transmission signal to the transmission unit. By such a construction, the oscillator 31a is commonly used at the time of transmission and reception and further miniaturization and cost reduction are possible. Particularly, even if the frequency of the transmission signal by the transmission unit and that of the station-transmitted signal So differ, it is possible to use the frequency variable oscillator 31a described above and sufficiently take advantage of the performance of such an oscillator 31a.

In the above second and third embodiments, the reception device Rx for detecting a distance to an object and the like may include a plurality of antennas 1 spaced apart from each other by a predetermined distance, and a switch unit for switching outputs of the plurality of antennas 1 and successively inputting them to an amplification unit 2. Alternatively, the reception device Rx for detecting a distance to an object and the like may include a plurality of antennas 1 spaced apart from each other by a predetermined distance, amplification units 2 provided in correspondence with the plurality of respective antennas 1, and a switch unit for switching outputs of the plurality of amplification units 2 and successively inputting them to a pulse extraction unit 3. Alternatively, the reception device Rx for detecting a distance to an object and the like may include a plurality of antennas 1 spaced apart from each other by a predetermined distance and amplification units 2 and pulse extraction units 3 provided in correspondence with the plurality of respective antennas 1. In this way, the reception device Rx may include a plurality of reception systems corresponding to the plurality of respective antennas 1. By such constructions, the reception device Rx can detect an azimuth direction of the object viewed from the reception device Rx by the triangulation principle based on distance(s) between the respective antennas 1 and distances from the respective antennas 1 to the object.

In the above second and third embodiments, the reception device Rx may include a plurality of antennas spaced apart from each other by a predetermined distance, and the amplification unit 2 may stop its operation for a predetermined time after a transmission signal in the form of short pulse waves is emitted from any one of these plurality of antennas. Alternatively, the reception device Rx may include a plurality of antennas spaced apart from each other by a predetermined distance and an amplification unit 2a disposed at a subsequent stage of the mixer 31b of the expander 31 and adapted to amplify an output of the mixer 31b of the expander 31, and the amplification unit 2a may stop its operation for a predetermined time (e.g. 100 ps) after a transmission signal in the form of short pulse waves is emitted from any one of these plurality of antennas. The amplification unit 2a is shown by broken line for the case of the reception device Rx of the third embodiment in FIG. 12. As described above, the reception device Rx may include a plurality of antennas spaced apart from each other by the predetermined distance and the amplification unit 2 or 2a connected before (at the previous stage of) or after (at the subsequent stage of) the mixer 31b of the expander 31, and the amplification unit 2 or 2a may stop its operation for the predetermined time (e.g. 100 ps) after a transmission signal in the form of short pulse waves is emitted from any one of the plurality of antennas. By such constructions, even if the antenna(s) other than the one that is transmitting the transmission signal in the form of short pulse waves directly receives the short pulse waves (directly received waves) from the antenna that is transmitting the transmission signal in the form of the short pulse waves instead of the reflected wave from the object, the amplification unit 2 or 2a connected before (at the previous stage of) or after (at the subsequent stage of) the mixer 31b stops its operation for the predetermined time after the transmission signal in the form of short pulse waves is emitted. Therefore, saturation of the amplification unit 2 or 2a caused by the directly received waves can be avoided and the reception device Rx can also detect an object located at a position closer thereto.

Further, in the above second and third embodiments, the reception device Rx may further include a rectifier 34 for performing half-wave or full-wave rectification on an input. The rectifier 34 is shown by broken line for the case of the reception device Rx of the third embodiment in FIG. 12. By such a construction, signals input to the integrators 33a, 33c of the pulse detector 33 have one polarity, wherefore integration in the integrators 33a, 33b becomes easier and circuit configurations of the integrators 33a, 33c can be simplified.

Next, another embodiment is described.

Fourth Embodiment

Although the reception device Rx requests retransmission to the transmission device Tx when failing to receive a data pulse train DT transmitted from the transmission device Tx in the first embodiment, a transmission device Tx repeatedly transmits the same bit value as a data pulse train DT a plurality of times beforehand each time in a fourth embodiment.

In this case, a reception device Rx sets a period corresponding to plural transmissions of ultra short pulse waves representing the same bit value as a reception period Wr, and an integrator 33a of a pulse detector 33 integrates an intermediate signal Sb output from a filter 32 during an integration period synchronized with the reception period Wr. Then, a level determiner 33b outputs a result of binary level determination based on an integration result as a pulse detection signal Sc.

More specifically, the pulse detector 33 sets a relatively large number of (e.g. about ten) integrations in the integrator 33a in a search mode and an output of the integrator 33a is binarized using an appropriate threshold value in the level determiner 33b, whereby even when an interference wave or the like overlaps (is superimposed on) a target wave, it becomes possible to extract the target wave by eliminating the influence of the interference wave and improve reception sensitivity if the number of overlapping is small. The integrator 33a performs no integration in the search mode. Note that the other construction and its operation are similar to the first embodiment. The fourth embodiment is also applicable to the above second and third embodiments and exhibits similar effects.

Next, another embodiment is described.

Fifth Embodiment

Figure 14:
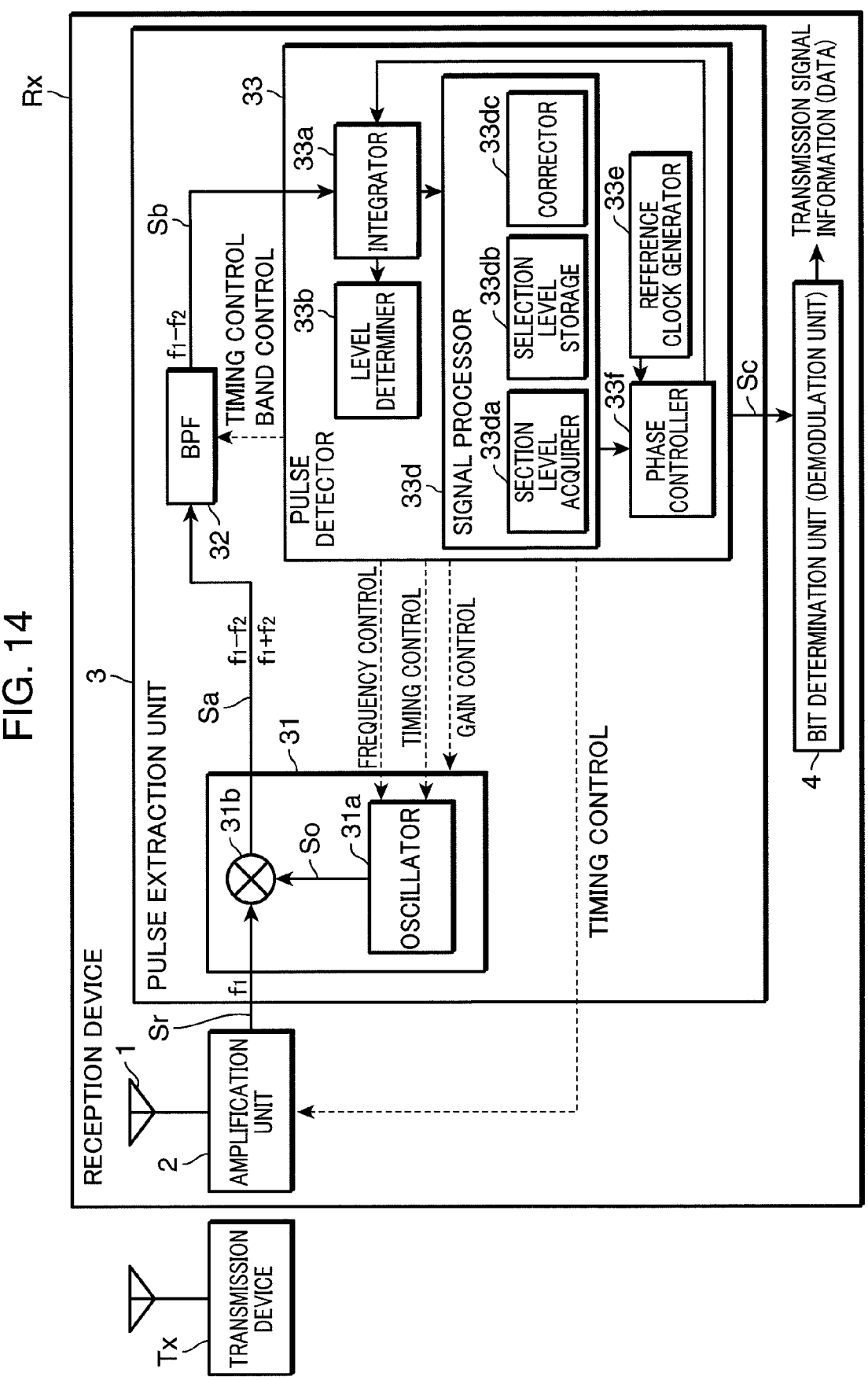
FIG. 14 is a block diagram showing a construction of a reception device according to a fifth embodiment, FIG. 15 are charts showing signal waveforms of respective parts used to describe an operation of the reception device shown in FIG. 14, FIG. 16 are charts showing signal waveforms of the respective parts used to describe an operation of a section level acquirer of the reception device shown in FIG. 14.

FIG. 14 is a block diagram showing a construction of a reception device according to a fifth embodiment.

The reception device for receiving a communication signal of the UWB communication system eliminates background noise having no constant frequency like a pulse signal of the communication signal of the UWB communication system and receives the significant pulse signal of the communication signal of the UWB communication system by receiving the pulse signal of the communication signal only during a predetermined period, e.g. a window period of 10 nsec in synchronization with the pulse signal of the communication signal as described above.

On the other hand, the UWB communication system has a very low spectral density of transmission power in one mode thereof as compared with other radio communication systems since no carrier waves are used and very short pulse signals whose pulse width is, for example, 1 nsec or shorter are used. Thus, internal circuits constituting respective parts of the reception device are constructed to have relatively high sensitivities and the reception device may pick up noise produced by these internal circuits as a signal. Particularly, since noise resulting from clock signals used in these internal circuits is cyclic, if such cyclic noise is synchronized with window periods, it may be misidentified as a reception pulse. Therefore, communication reliability is reduced.

The reception device Rx in this fifth embodiment is a device capable of further improving communication reliability and has a construction, for example, as shown in FIG. 14. Specifically, the reception device Rx of the fifth embodiment shown in FIG. 14 differs from the reception device Rx of the first embodiment shown in FIG. 1 in that a pulse detector 33 additionally includes a signal processor 33d, a reference clock generator 33e and a phase controller 33f for the purpose of improving communication reliability. A construction similar to the first embodiment is denoted by the same reference numerals and not described.

The pulse detector 33 of the fifth embodiment includes an integrator 33a, a level determiner 33b, the signal processor 33d, the reference clock generator 33e and the phase controller 33f.

The signal processor 33d is connected to the integrator 33a and includes, for example, a CPU (Central Processing Unit) for performing specified arithmetic processings, a ROM (Read Only Memory) storing a specified control program, a RAM (Random Access Memory) for temporarily saving data, their peripheral circuits and the like. The signal processor 33d executes the control program stored in the ROM to functionally include a section level acquirer 33da for acquiring a signal level value AD, which is an output of the integrator 33a and a digital signal, for each of a plurality of sections obtained by dividing a cycle of a pulse signal and causing signal levels in the respective sections obtained in a state where no radio communication signal of the UWB communication system is received by an antenna 1 to be stored in one-to-one correspondence with the respective sections in a section level storage 33db, the section level storage 33db for storing the signal levels in the respective sections acquired by the section level acquirer 33da in the state where no communication signal is received by the antenna 1 in one-to-one correspondence with the sections, and a corrector 33dc for correcting signal levels in the respective sections received by the antenna 1 based on the signal levels in the respective sections stored in the section level storage 33db.

The reference clock generator 33e is constructed, for example, using a crystal oscillator, generates a clock signal having the same cycle as that of the pulse signal in the communication signal of the UWB communication system and outputs it to the phase controller 33f.

The phase controller 33*f* is connected to the signal controller 33*d* and the reference clock generator 33*e*, and outputs a gate signal GT used to control an operation timing to the integrator 33*a* based on the clock signal output from the reference clock generator 33*e*. More specifically, the phase controller 33*f* outputs a pulse signal having a pulse width nearly equal to or slightly larger than that of the pulse signal in the communication signal of the UWB communication system, e.g. 10 nsec and indicating a window period as the gate signal GT in the cycle of the pulse signal in the communication signal of the UWB communication system, e.g. in a cycle of 50 nsec. The phase controller 33*f* also changes a timing of the pulse signal indicating the window period in the gate signal GT in accordance with a control signal from the signal processor 33*d*.

The integrator 33*a* performs signal integration in synchronization with the timing of the pulse signal in the gate signal GT, but performs no signal integration at other timings. Thus, in a pulse extraction unit 3, a communication signal RF received by the antenna 1 is detected at the timing of the pulse signal in the gate signal GT, i.e. during the window period, and integrated in the integrator 33*a* and an integration value is output to the signal processor 33*d*.

Similar to the first embodiment, a bit determination unit 4 is a circuit connected to the pulse extraction unit 3 and adapted to extract a bit value of a radio signal transmitted from the transmission device Tx based on a pulse detection signal Sc output from the pulse detector 33 of the pulse extraction unit 3. Here, in the bit determination unit 4 of the fifth embodiment, the communication signal RF is demodulated based on the signal levels in the respective sections corrected by the corrector 33*dc*.

Figure 15A:
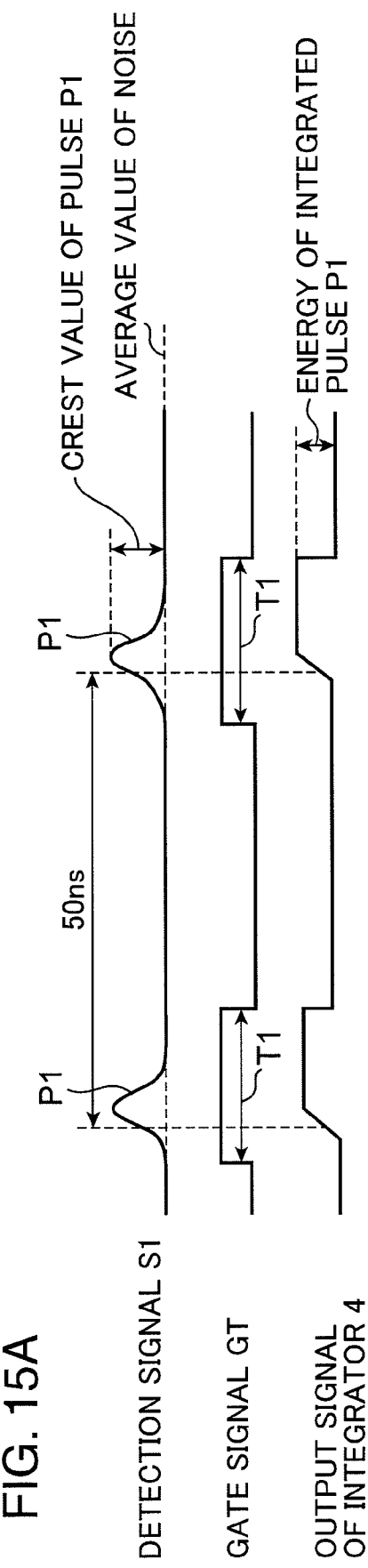
Figure 15B:
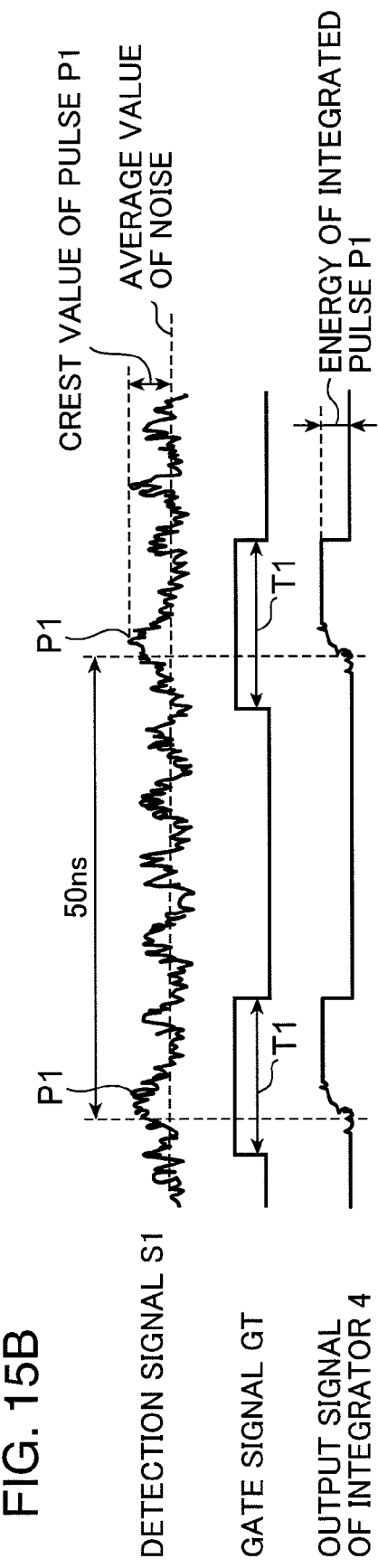
Figure 16:
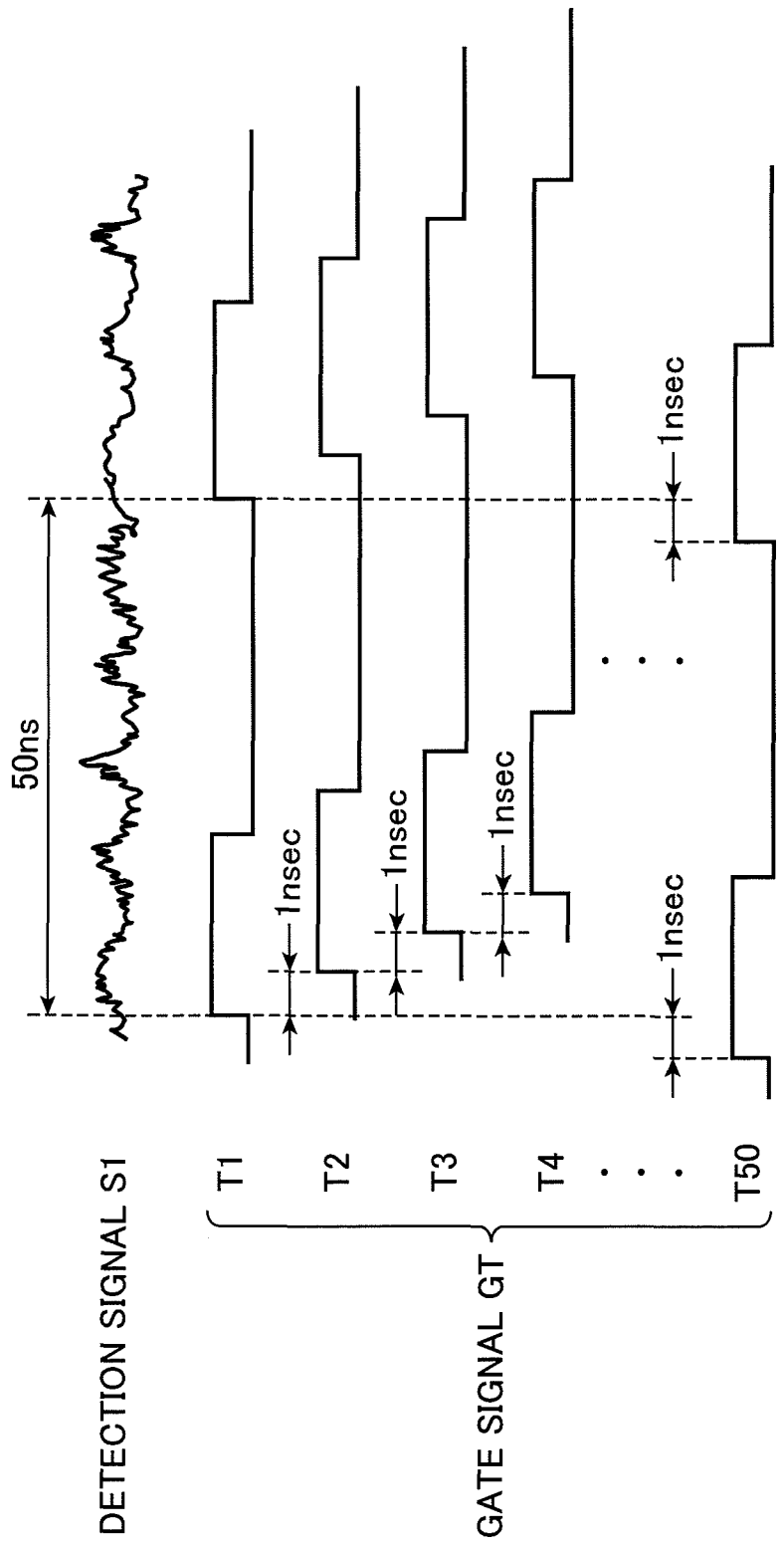
Figure 17:
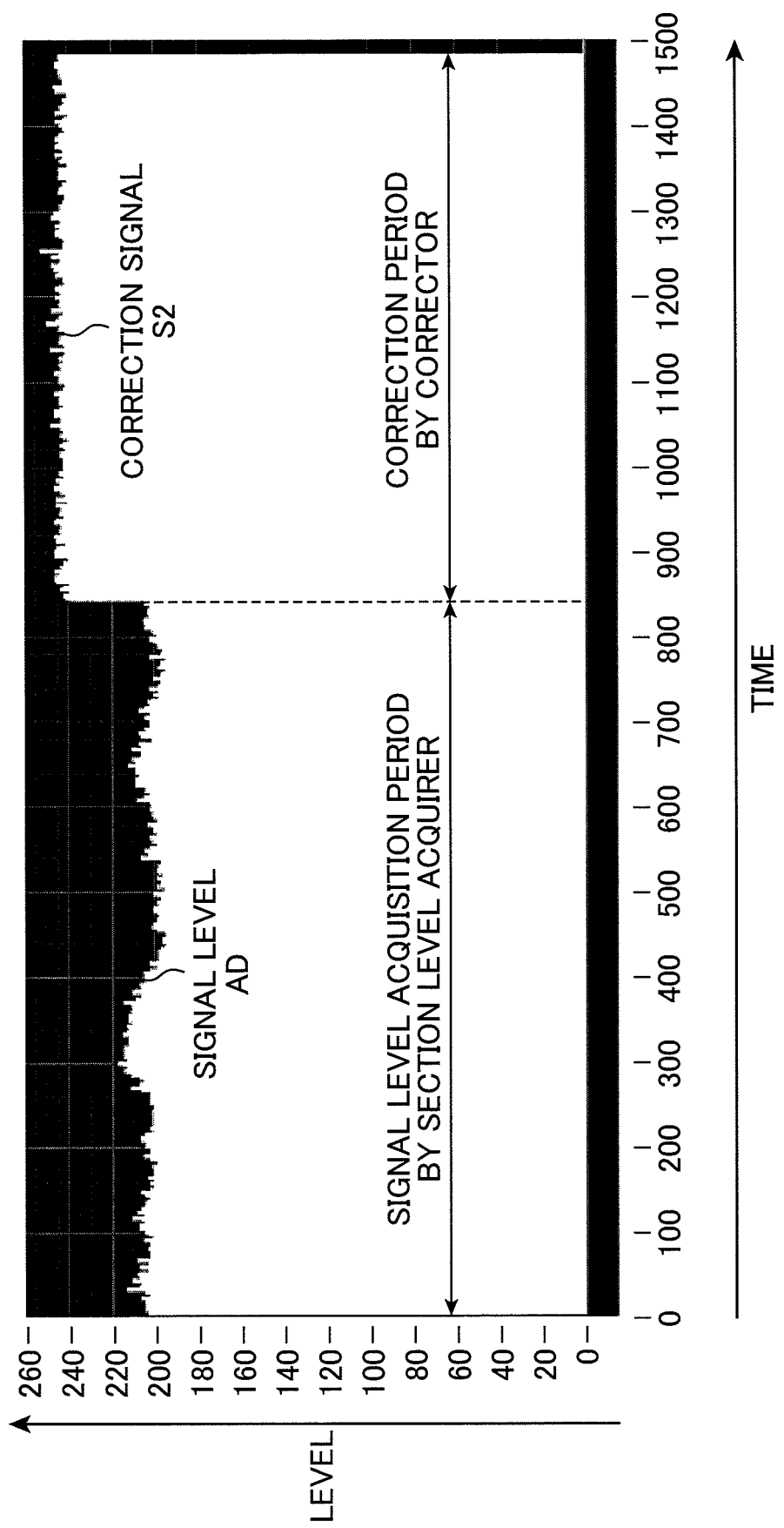
FIG. 17 is a graph showing an example of a correction signal obtained by a corrector of the reception device shown in FIG. 14.

Next, an operation of the radio reception device Rx constructed as above is described. FIG. 15 are charts showing signal waveforms of the respective parts used to describe the operation of the reception device shown in FIG. 14. FIG. 15A shows examples of signal waveforms under an ideal environment unaffected by noise, and FIG. 15B shows examples of signal waveforms when a cyclical circuit noise is superimposed on a reception signal. In FIGS. 15A and 15B, the respective signal waveforms of a detection signal S1, the gate signal GT and an output signal of the integrator 33*a* are shown in this order from top. FIG. 16 is a chart showing signal waveforms of the respective parts used to describe an operation of the section level acquirer of the reception device shown in FIG. 14. In FIG. 16, the respective signal waveforms of the detection signal S1 and the gate signal GT are shown in this order from top. FIG. 17 is a graph showing an example of a correction signal obtained by the corrector of the reception device shown in FIG. 14. A horizontal axis of FIG. 17 represents time and a vertical axis thereof represents level.

As shown in FIG. 15A, under the ideal environment unaffected by noise, the radio communication signal RF received by the antenna 1 is demodulated into pulses in the pulse extraction unit 3, and demodulated pulses P1 are input as the detection signal S1 to the integrator 33*a*. The demodulated pulse P1 is integrated by the integrator 33*a* at the timing of the pulse signal in the gate signal GT output from the phase controller 33*f*, i.e. during a window period T1.

On the other hand, when cyclic noise is superimposed on the reception signal as shown in FIG. 15B, noise other than the demodulated pulses P1 is cyclically superimposed on the detection signal S1 to increase an average level of the noise. In this case, since a crest value of the demodulated pulse P1 is a value obtained by subtracting the average level of the noise from a peak of the demodulated pulse P1, the crest value of the demodulated pulse P1 decreases as the average level of the noise increases. Thus, energy of the demodulated pulse P1 is reduced, with the result that an integration value obtained by the integrator 33*a* integrating the demodulated pulse P1 decreases to also decrease the signal level value AD.

Further, since a difference between the crest value of the demodulated pulse P1 and that of noise decreases as shown in FIG. 15B, the noise may be synchronized with a window period T1 in the gate signal GT and misidentified as the reception pulse.

Accordingly, in the reception device Rx, the signal level value AD in the state where no radio communication signal RF is transmitted from the transmission device Tx and, thus, not received by the antenna 1, i.e. the signal level value AD in each window period resulting from the cyclic noise in the internal circuits is acquired by the selection level acquirer 33*da*.

First of all, in the state where no radio communication signal RF is received by the antenna 1, the demodulated pulses P1 are not included in the detection signal S1, wherefore the detection signal S1 resulting from the noise is input to the integrator 33*a*.

Then, the gate signal GT is output in the phase of the window period T1 from the phase controller 33*f* to the integrator 33*a* in accordance with a control signal from the selection level acquirer 33*da*, the detection signal S1 is integrated at the timing of the window period T1 by the integrator 33*a*, and the signal level value AD corresponding to its integration value is input to the selection level acquirer 33*da*. The selection level acquirer 33*da* causes the phase controller 33*f* to output the gate signal GT in the phase of the window period T1 during a predetermined period set beforehand, e.g. 8 μsec. Then, the selection level acquirer 33*da* averages the signal level values AD in the window period T1 obtained during the period of 8 μsec and causes the selection level storage 33*db* to store an average value as an average level value AVT1 in the window period T1.

Subsequently, the selection level acquirer 33*da* causes the phase controller 33*f* to output the gate signal GT for a predetermined period, e.g. 8 μsec at a timing phase-shifted from the window period T1, e.g. in the phase of a window period T2 delayed by 1 nsec from the window period T1. The signal level values AD in the window period T2 obtained over a plurality of cycles during the period of 8 μsec are averaged by the selection level acquirer 33*da*, and an average value is stored as an average level value AVT2 in the window period T2 in the selection level storage 33*db*.

Similarly, the window periods are successively shifted by 1 nsec by the selection level acquirer 33*da*, average level values AVT1 to AVT50, i.e. the signal level values in the respective window periods resulting from the cyclic noise in the internal circuits, obtained during 50 window periods defined in a period of 50 nsec, which is a cycle of the demodulated pulse P1, are stored in the selection level storage 33*da*. In this case, the window periods T1 to T50 correspond to an example of a plurality of sections as claimed.

The selection level acquirer 33*da* may store the average level values AVT1 to AVT50 of the respective window periods at addresses of the signal level storage 33*db* in correspondence with the respective window periods (sections) and store identification data indicating the respective window periods and the average level values AVT1 to AVT50 in correspondence in the selection level storage 33*db*.

Subsequently, the radio communication signal RF received by the antenna 1 is similarly demodulated and integrated in the pulse extraction unit 3 and input as the signal level values AD to the corrector 33*dc*. The signal level values AD in the respective window periods T1 to T50 are corrected by the corrector 33dc by having the average level values AVT1 to AVT50 stored in the selection level storage 33db, i.e. the signal level values in the respective window periods resulting from the cyclic noise in the internal circuits respectively subtracted therefrom, and a correction signal S2 after this correction is demodulated by the bit determination unit (demodulation unit) 4 and output as transmission signal information (data) to the outside.

In this way, even if the cyclic noise produced in the internal circuits is superimposed on the signal level values AD, the signal level values AD are corrected by the corrector 33dc by having the average level values AVT1 to AVT50 stored in the selection level storage 33db, i.e. the signal level values in the respective window periods resulting from the cyclic noise in the internal circuits subtracted therefrom, and the influence of the cyclic noise is reduced. Therefore, communication reliability can be improved.

Instead of storing the average level values AVT1 to AVT50 in the selection level storage 33db, the selection level acquirer 33da may store the signal level values AD in the window periods T1 to T50 in the selection level storage 33db as they are and the corrector 33dc may correct the reception signal using the signal level values AD in the window periods T1 to T50. However, if the corrector 33dc uses the average level values AVT1 to AVT50, accuracy in measuring the signal level values in the respective window periods resulting from the cyclic noise in the internal circuits is improved, whereby communication reliability can be improved.

The corrector 33dc may generate a correction signal S2 by adding differences between a reference value REF set beforehand and the average level values AVT1 to AVT50 stored in the selection level storage 33db respectively to the signal level values AD in the respective window periods T1 to T50. More specifically, if AD1 to AD50, for example, denote the signal level values AD in the respective window periods T1 to T50, the corrector 33dc may generate the correction signal S2 in accordance with the following equation (1).

$$S2 = ADn + (REF - AVTn) \quad (1)$$

(where n=1, 2, 3, ..., 50).

In this case, if the reference value REF is, for example, "240", the correction signal S2 in the state where the radio communication signal RF is not received is approximately equal to the reference value REF, i.e. "240" as shown in FIG. 17. Then, even if the demodulated pulses P1 have, for example, a negative value, the correction signal S2 has a positive value. Thus, the signal processor 33d needs not process negative values, thereby facilitating signal processing.

Further, the selection level acquirer 33da may store differences between the reference value REF set beforehand and the average level values AVT1 to AVT50 as defined by the following equation (2) as correction values C1 to C50 in the respective window periods T1 to T50 in the selection level storage 33db.

$$Cn = REF - AVTn \quad (2)$$

(where n=1, 2, 3, ..., 50).

Then, the corrector 33dc may generate the correction signal S2 by adding the correction values C1 to C50 in the respective window periods stored in the selection level storage 33db respectively to the signal level values AD1 to AD50 in the respective window periods T1 to T50 as shown in the following equation (3).

$$S2 = ADn + Cn \quad (3)$$

(where n=1, 2, 3, ..., 50).

Thus, it is sufficient for the corrector 33dc to perform an arithmetic processing of equation (3) upon correcting the radio signal RF, wherefore an arithmetic processing load of the corrector 33dc at the time of receiving the radio signal RF can be reduced more than in the case of performing the arithmetic processing of equation (1).

Although 50 window periods (sections) are provided in the pulse cycle of the radio communication signal RF in the above example, the number of the window periods (phase differences) may be appropriately set. As the phase differences of the respective window periods are reduced to increase the number of the window periods, correction accuracy is improved, wherefore communication reliability is improved.

Although the adjacent window periods overlap in the above example, they may be set one after another without overlapping. In this case, the number of the window periods in the pulse cycle of the radio signal RF can be reduced.

Although the window periods are set at 10 nsec substantially equal to or slightly longer than the pulse width of the pulse signal in the UWB communication in the above example, the number of the window periods in the pulse cycle of the radio signal RF can be reduced by extending the window periods. In this case, if the window periods are extended, the integration time of noise components is also extended to reduce an S/N ratio (signal-to-noise ratio). Thus, the window periods are appropriately set by a balance between an increase in circuit load caused by increasing the number of the window periods and a reduction in the S/N ratio caused by extending the window periods.

Although the reception device Rx is so constructed as to integrate the entire signal wave of the intermediate signal Sb in the above embodiments, a part of the intermediate signal Sb, e.g. a rising part of the signal wave may be integrated by shortening the integration period. For example, the integration period is set at about 1/10 (=about 0.2 ns) of the duration of the communication signal of the UWB communication system.

This specification discloses various aspects of technologies as described above. Out of these, main technologies are summarized as follows.

A reception device according to one aspect is for receiving a transmission signal of an ultra wide band system, which is a communication signal used to transmit a data in a non-coherent manner, and comprises an expander for outputting an intermediate signal by frequency-converting a reception signal obtained by receiving the transmission signal, wherein the expander includes an oscillator for outputting a station-transmitted signal having a frequency different from a center frequency of the reception signal and a waveform independent of the phase and waveform of short pulse waves included in the reception signal, and a mixer for outputting the intermediate signal by multiplying the reception signal and the station-transmitted signal; and the oscillator intermittently operates in synchronization with generation timings of the short pulse waves included in the reception signal.

According to this construction, since the oscillator intermittently operates and does not constantly operate, power consumption can be reduced by using a UWB communication system. Since the expander frequency-converts the reception signal, power consumption can be reduced even during an intermittent driving period in the case of down-conversion. Further, in the case of including a filter at a subsequent stage, it is possible to realize design facilitation, miniaturization and cost reduction of its filter circuit.

In another aspect, in the above reception device, a filter is further provided for permitting the passage of a frequency component equivalent to a target short pulse wave out of the intermediate signal, and the filter is intermittently operable in synchronization with the generation timings of the short pulse waves included in the reception signal.

According to this construction, since the filter can intermittently operate and does not constantly operate, power consumption can be reduced by using the UWB communication system.

In another aspect, in these above reception devices, a pulse detector is further provided for discriminating a target pulse and an arrival time of the target pulse from the intermediate signal and outputting a pulse detection signal; and the pulse detector is intermittently operable in synchronization with the generation timings of the short pulse waves included in the reception signal.

According to this construction, since the pulse detector can intermittently operate and does not constantly operate, power consumption can be reduced by using the UWB communication system.

In another aspect, in these above reception devices, a pulse detector is further provided for discriminating a target pulse and an arrival time of the target pulse from the intermediate signal and outputting a pulse detection signal; the communication signal includes short pulse waves successively indicating the same bit value a predetermined plurality of times set beforehand each time; the pulse detector includes an integrator for integrating the intermediate signal during a period of the plurality of times and a level determiner for outputting a result of binary level determination based on an integration result of the integrator as a pulse detection signal.

According to this construction, even if an interference wave or the like overlaps the target wave, the influence of the interference wave or the like is substantially eliminated, the target wave can be extracted and reception sensitivity can be improved.

In another aspect, in the above reception device, at least one of the integrator and the level determiner intermittently operates in synchronization with the generation timings of the short pulse waves included in the reception signal.

According to this construction, since at least one of the integrator and the level determiner intermittently operates and does not constantly operate, power consumption can be reduced by using the UWB communication system.

In another aspect, in the above reception device, a bit determination unit is provided for retrieving a bit value of the data from the pulse signal output from the pulse detector; and the bit determination unit operates after the pulse detector discriminates a target pulse.

According to this construction, power consumption before the discrimination of the target pulse by the pulse detector can be reduced.

In another aspect, in these above reception devices, the transmission signal is a radio signal; and the pulse detector further includes a detector for detecting an interference wave, which is generated by a wireless system other than the transmission device for transmitting the transmission signal, from the intermediate signal.

According to this construction, the target short pulse wave and interference waves and the like can be distinguished.

In another aspect, in these above reception devices, the transmission signal is short pulse waves arranged at regular time intervals instead of the communication signal used to transmit the data in the non-coherent manner; and the short pulse waves transmitted from the transmission device for transmitting the transmission signal are incident on an object and reflected waves thereof are received.

According to this construction, the reception device is constructed as a sensor, and a distance to an object and a motion of the object can be more accurately detected.

In another aspect, in the above reception device, a transmission unit is further provided for transmitting the transmission signal; and the oscillator of the expander outputs the station-transmitted signal to the mixer and a signal having a frequency corresponding to the transmission signal to the transmission unit.

According to this construction, the oscillator is commonly used at the time of transmission and reception, and miniaturization and cost reduction of the reception device can be realized.

In another aspect, in the above reception device, the transmission signal is short pulse waves arranged at regular time intervals instead of the communication signal used to transmit the data in the non-coherent manner; the short pulse waves transmitted from the transmission device for transmitting the transmission signal are incident on an object and reflected waves thereof are received; a pulse detector is further provided for discriminating a target pulse and an arrival time of the target pulse from the intermediate signal and outputting a pulse detection signal; an object motion detector is further provided for detecting whether or not the object is in motion based on the pulse detection signal output from the pulse detector; the pulse detector receives the reflected waves a plurality of times at the arrival time at which the target pulse is discriminated and outputs reception intensities of the reflected waves as the pulse detection signal; and the object motion detector detects whether or not the object is in motion based on a variance value of the respective reception intensities obtained by receiving the reflected waves a plurality of times.

According to this construction, whether or not the object is in motion is detected based on the variance value of the respective reception intensities obtained by receiving the reflected waves from the object a plurality of times at the arrival time at which the target pulse is discriminated. Thus, whether or not the object is in motion can be more accurately detected.

In another aspect, in the above reception device, the transmission signal is short pulse waves arranged at regular time intervals instead of the communication signal used to transmit the data in the non-coherent manner; the short pulse waves transmitted from the transmission device for transmitting the transmission signal are incident on an object and reflected waves thereof are received; a pulse detector is further provided for discriminating a target pulse and an arrival time of the target pulse from the intermediate signal and outputting a pulse detection signal; and the pulse detector discriminates the target pulse by successively scanning areas from the one near the reception device toward the one distant from the reception device or from the one distant from the reception device toward the one near the reception device.

According to this construction, since the target pulse is detected by successively scanning the area from the one near the reception device toward the one distant from the reception device or vice versa, the influence of multipaths can be reduced, and the presence of the object and the distance to the object can be more accurately detected.

In another aspect, in the above reception device, the pulse detector includes a plurality of integrators for respectively integrating the intermediate signal; and a level determiner for discriminating the target pulse and the arrival time of the target pulse by performing binary level determination based on respective integration results of the plurality of integrators, and outputting the pulse detection signal.

According to this construction, since the plurality of integrators are provided, integration start timings of the respective integrators can be shifted from each other for one certain reception period, whereby whether the object is near or distant and a moving direction of the object in motion can be detected.

In another aspect, in these above reception devices, a plurality of antennas are provided for receiving the transmission signal and are spaced apart from each other by a predetermined distance.

According to this construction, an azimuth direction of the object viewed from the reception device can be detected by the so-called triangulation principle.

In another aspect, in these above reception devices, an amplifier connected before or after the mixer is further provided, and stops its operation for a predetermined period after the short pulse waves of the transmission signal are emitted.

According to this construction, even if the antenna for receiving the short pulse waves does not receive the reflected waves, but directly receives the short pulse waves from the antenna, which transmitted the short pulse waves, the amplifier connected before or after the mixer stops its operation for the predetermined period after the emission of the short pulse waves. Thus, saturation of the amplifier caused by direct reception of the short pulse waves can be avoided, and the reception device can also detect an object located at a position closer thereto.

In another aspect, in these above reception devices, the oscillator generates the station-transmitted signal by a logical combination of predetermined clock signals before and after a delay.

According to this construction, the oscillator is constructed by a relatively simple circuit and power consumption can be reduced.

In another aspect, in the above reception device, the oscillator includes a delay line circuit for delaying the predetermined clock signals and controls the frequency of the station-transmitted signal by controlling a delay time in the delay line circuit.

According to this construction, the frequency of the station-transmitted signal can be arbitrarily controlled to a predetermined frequency.

In another aspect, in these above reception devices, the delay line circuit is constructed by a part of any one of a phase-locked loop circuit, a delay-locked loop circuit and a frequency-locked loop circuit.

According to this construction, a general circuit can be employed as the oscillator, which is advantageous in terms of cost.

In another aspect, in these above reception devices, the oscillator includes a signal generating circuit for generating a plurality of signals at mutually different generation timings by logical multiplication of predetermined clock signals before and after a delay, and a pulse selecting circuit for generating the station-transmitted signal by combining the plurality of signals.

According to this construction, not only the frequency, but also the waveform of the station-transmitted signal can be arbitrarily controlled.

In another aspect, in the above reception device, a filter for permitting the passage of a frequency component equivalent to a target short pulse wave out of the intermediate signal is provided at a subsequent stage of the expander; and the expander outputs the intermediate signal having a frequency lower than that of the reception signal by frequency-converting the reception signal obtained by receiving the communication signal such that the intermediate signal has the same bandwidth as the target short pulse wave and an upper limit of a passband of the filter is lower than a lower limit frequency of the target short pulse wave.

According to this construction, since the expander down-converts the frequency of the reception signal, it is possible to reduce power consumption and realize design facilitation, miniaturization and cost reduction of its filter circuit. Since the intermediate signal has the same bandwidth as the target short pulse wave and the upper limit of the passband of the filter is lower than the lower limit frequency of the target short pulse wave, the frequency of the station-transmitted signal can be sufficiently different from the frequency of the reception signal, which is effective.

In another aspect, in the above reception device, a pulse detector is further provided for discriminating a target pulse and an arrival time of the target pulse from the intermediate signal and outputting a pulse detection signal; the communication signal includes a synchronization pulse train used to synchronize the transmission device and the reception device in transmission and reception of the communication signal and a data pulse train containing a data to be transmitted; the pulse detector has a search mode for detecting a reception timing of the synchronization pulse train and a data mode for extracting the pulse detection signal from the data pulse train based on the reception timing of the synchronization pulse train detected in the search mode; the pulse detector outputs a period control signal used to adjust a timing of a reception period, which is a period during which frequency conversion of the reception signal is performed, and a duration of the reception period to the expander; and the expander intermittently operates during every reception period synchronized with the reception timing of the data pulse train at least while the pulse detector is operating in the data mode.

According to this construction, since the timings for receiving the short pulse waves are determined using the synchronization pulse train and the reception periods are so set that the expander intermittently operates at the determined timings, interference waves and the like generated outside a transmission period of the target short pulse wave can be temporally separated by frequency conversion by the expander with only the transmission period of the short pulse waves from the transmission device set as the reception period. Further, since a frame transmitted from the transmission device includes the synchronization pulse train and the data pulse train and the pulse detector has the search mode and the data mode, the transmission timings of the short pulse waves from the transmission device are detected based on the synchronization pulse train in the search mode and the reception periods for the data pulse train can be controlled in the subsequent data mode. Further, if the filter has an active configuration, separation performance of interference waves and the like is further improved by synchronizing the operation of the filter with that of the expander and causing the filter to intermittently operate.

In another aspect, in these above reception devices, the pulse detector outputs a frequency control signal used to adjust the frequency of the station-transmitted signal in the oscillator to the oscillator.

According to this construction, since the pulse detector controls the frequency of the station-transmitted signal, the influence of the interference waves and the like can be reduced, for example, by adjusting the frequency of the station-transmitted signal such that the frequency of the intermediate signal is removed from the passband of the filter. Further, the frequency of the station-transmitted signal can also be so adjusted as to increase a signal level of the intermediate signal. Further, since the frequency of the station-transmitted signal can also be adjusted according to the frequency of the transmission signal, transmission signals having a plurality of different frequencies can also be dealt with.

In another aspect, in these above reception devices, the pulse detector outputs a band control signal used to adjust the passband of the filter to the filter.

According to this construction, since the pulse detector controls the passband of the filter, the influence of the interference waves and the like can be reduced, for example, by adjusting the passband of the filter such that frequencies of the intermediate signal corresponding to the interference waves and the like are removed from the passband of the filter. Further, the passband of the filter can also be so adjusted as to increase the signal level of the intermediate signal.

In another aspect, in these above reception devices, the expander includes a first amplifier for amplifying the intermediate signal; and the pulse detector outputs a first gain control signal used to adjust an amplification factor of the first amplifier to the first amplifier.

According to this construction, since the amplification factor of the intermediate signal output from the expander can be adjusted, the signal level of the intermediate signal can be so optimized as not to saturate or not to reduce an SNR, wherefore the pulse can be more accurately extracted.

In another aspect, in these above reception devices, the expander includes a second amplifier for amplifying the station-transmitted signal; and the pulse detector outputs a second gain control signal used to adjust an amplification factor of the second amplifier to the second amplifier.

According to this construction, since the signal level of the station-transmitted signal to be input to the mixer can be adjusted, the signal level of the intermediate signal can be adjusted. Thus, the signal level of the intermediate signal can be so optimized as not to saturate or not to reduce an SNR and the pulse can be more accurately extracted.

In another aspect, in these above reception devices, the communication signal includes short pulse waves successively indicating the same bit value a predetermined plurality of times set beforehand each time; and the pulse detector includes an integrator for integrating the intermediate signal during a period of the plurality of times and a level determiner for outputting a result of binary level determination based on an integration result of the integrator as a pulse detection signal.

According to this construction, since the transmission device is so constructed beforehand as to transmit the same bit value a plurality of times each time and the reception device integrates signals having the same bit value using the integrator, a level difference can be made larger by integration if there is a level difference in signal level between the target short pulse wave and interference waves and the like, and the target short pulse wave and the interference waves and the like can be more easily separated.

In another aspect, in the above reception device, the communication signal is a radio signal including pulsed signals in a predetermined cycle; and each reception device comprises a reception unit for receiving the communication signal; a section level acquirer for acquiring a signal level of a reception signal obtained by the reception unit for each of a plurality of sections obtained by dividing the cycle; a section level storage for storing signal levels of the respective sections, which are obtained by the section level acquirer in a state where no communication signal is received by the reception unit, in one-to-one correspondence with the respective sections; a corrector for correcting the respective signal levels of the respective sections received by the reception unit based on the signal levels of the respective sections stored in the section level storage, and a demodulation unit for demodulating the communication signal according to the signal levels of the respective sections corrected by the corrector.

According to this construction, the radio signal including the pulsed signals in the predetermined cycle is received by the reception unit, and the signal level of the radio signal obtained by the reception unit is acquired for each of the plurality of sections obtained by dividing the cycle of the pulse. Then, the signal levels of the respective sections acquired in the state where no radio signal is received are stored in one-to-one correspondence with the respective sections in the section level storage. Further, the signal levels of the respective sections received by the reception unit are respectively corrected based on the signal levels of the respective sections stored in the section level storage, and the radio signal is demodulated according to the corrected signal levels of the respective sections. Therefore, the influence of cyclic noise is reduced by the correction and communication reliability can be improved.

In another aspect, in the above reception device, the section level acquirer acquires the signal levels in the plurality of sections while successively shifting the sections where the signal levels are acquired.

According to this construction, the reception device is provided which reduces the influence of cyclic noise and improves communication reliability by comprising the section level acquirer for acquiring the signal levels in the plurality of sections while successively shifting the sections where the signal levels are acquired.

In another aspect, in these above reception devices, the section level acquirer acquires the signal levels of the respective sections over a plurality of cycles, calculates an average value of the signal levels acquired in each of the sections in the plurality of cycles for each section, and causes the section level storage to store the calculated average value of each section as the signal level of each section.

According to this construction, since the average value of each section is treated as the signal level of each section, accuracy in measuring the signal level in each window period resulting from cyclic noise in internal circuits is improved. Therefore, communication reliability is improved.

In another aspect, in these above reception devices, the corrector performs the correction by subtracting the signal level of each section stored in the section level storage from that of each section received by the reception unit.

According to this construction, the reception device is provided which reduces the influence of cyclic noise and improves communication reliability by comprising the corrector for performing the correction by subtracting the signal level of each section stored in the section level storage from that of each section received by the reception unit.

In another aspect, in these above reception devices, the corrector performs the correction by adding a difference between a reference value set beforehand and the signal level of each section stored in the section level storage to the signal level of each section received by the reception unit.

According to this construction, the corrected signal in the state where no radio signal is received is nearly equal to the reference value. Thus, the corrected signal has a positive value, for example, even if the demodulated pulse has a negative value. Since it is not necessary to process negative values, signal processing is easier.

In another aspect, in the above reception device, the section level acquirer causes the section level storage to store a difference between a reference value set beforehand and the signal level acquired for each section as the signal level of each section, and the corrector performs the correction by adding the signal level of each section stored in the section level storage to the signal level of each section received by the reception unit.

According to this construction, since the section level acquirer causes the selection level storage to store the difference between the reference value set beforehand and the signal level acquired for each section as the signal level of each section, an arithmetic processing load of the corrector at the time of receiving a radio signal can be reduced.

This application claims priority to Japanese Patent Application Serial Number 2008-138679, filed on May 27, 2008, the content of which is incorporated herein.

The present invention has been appropriately and sufficiently described above to be expressed by way of embodiments with reference to the drawings, but it should be appreciated that a person skilled in the art can easily modify and/or improve the above embodiments. Accordingly, a modified embodiment or improved embodiment carried out by the person skilled in the art should be interpreted to be embraced by the scope as claimed unless departing from the scope as claimed.

INDUSTRIAL APPLICABILITY

According to the present invention, a reception device can be provided which is suitably used for an ultra wide band system.

What is claimed is:

1. A reception device for receiving a transmission signal of an ultra wide band system, which is a communication signal used to transmit data in a non-coherent manner, comprising:
    an expander for outputting an intermediate frequency signal by frequency-converting a reception signal obtained by receiving the transmission signal; and
    a pulse detector for discriminating a target pulse and an arrival time of the target pulse from the intermediate frequency signal and outputting a pulse detection signal, wherein:
    the expander includes:
        an oscillator for outputting a station-transmitted signal having a frequency different from a center frequency of the reception signal and a waveform independent of the phase and waveform of pulse waves included in the reception signal, and
        a mixer for outputting the intermediate frequency signal by multiplying the reception signal and the station-transmitted signal, wherein
    the oscillator intermittently operates in synchronization with generation timings of the pulse waves included in the reception signal,
    the pulse waves successively indicate the same bit value a predetermined number of times set beforehand, and
    the pulse detector includes an integrator for integrating the intermediate frequency signal during a period corresponding to the predetermined number of times, and a level determiner for outputting a result of binary level determination based on an integration result of the integrator as the pulse detection signal.

2. A reception device according to claim 1, further comprising:
    a filter for permitting passage of a frequency component equivalent to the target pulse out of the intermediate frequency signal,
    wherein the filter is intermittently operable in synchronization with the generation timings of the pulse waves included in the reception signal.

3. A reception device according to claim 1,
    wherein the pulse detector is intermittently operable in synchronization with the generation timings of the pulse waves included in the reception signal.

4. A reception device according to claim 1,
    wherein at least one of the integrator and the level determiner intermittently operates in synchronization with the generation timings of the pulse waves included in the reception signal.

5. A reception device according to claim 4, further comprising:
    a bit determination unit for retrieving a bit value of the pulse detection signal output from the pulse detector,
    wherein the bit determination unit operates after the pulse detector discriminates the target pulse.

6. A reception device according to claim 1, wherein:
    the transmission signal is a radio signal, and
    the pulse detector further includes a detector for detecting an interference wave, which is generated by a wireless system other than a transmission device for transmitting the transmission signal, from the intermediate frequency signal.

7. A reception device according to claim 1, wherein:
    the pulse waves are arranged at a regular time interval, and
    the pulse waves are incident on an object and reflected waves thereof are received.

8. A reception device according to claim 7, further comprising:
    a transmission unit for transmitting the transmission signal,
    wherein the oscillator of the expander outputs the station-transmitted signal to the mixer, and outputs a signal having a frequency corresponding to the transmission signal to the transmission unit.

9. A reception device according to claim 7, wherein the pulse detector further includes:
    another integrator for integrating the intermediate frequency signal; and
    the level determiner for discriminating the target pulse and the arrival time of the target pulse by performing the binary level determination based on respective integration results of the integrator and the another integrator, and outputting the pulse detection signal.

10. A reception device according to claim 7, further comprising:
    a plurality of antennas for receiving the transmission signal,
    wherein the plurality of antennas are spaced apart from each other by a predetermined distance.

11. A reception device according to claim 7, further comprising:
    an amplifier connected to one of an output of the mixer for outputting the intermediate frequency signal and an input of the mixer for receiving the station-transmitted signal outputted from the oscillator,
    wherein the amplifier stops its operation for a predetermined period after the pulse waves of the transmission signal are emitted.

12. A reception device according to claim 1,
    wherein the oscillator generates the station-transmitted signal by a logical combination of predetermined clock signals before and after a delay.

13. A reception device according to claim 12,
    wherein the oscillator includes a delay line circuit for delaying the predetermined clock signals and controls the frequency of the station-transmitted signal by controlling a delay time in the delay line circuit.

14. A reception device according to claim 13, wherein the delay line circuit is constructed by a part of any one of a phase-locked loop circuit, a delay-locked loop circuit and a frequency-locked loop circuit.

15. A reception device according to claim 12, wherein the oscillator includes:
   a signal generating circuit for generating a plurality of signals at mutually different generation timings by logical multiplication of the predetermined clock signals before and after the delay; and
   a pulse selecting circuit for generating the station-transmitted signal by combining the plurality of signals.

16. A reception device for receiving a transmission signal which is of an ultra wide band system, and has pulse waves arranged at a regular time interval, and has been incident on an object and reflected, the reception device comprising:
   an expander for outputting an intermediate frequency signal by frequency-converting a reception signal obtained by receiving the transmission signal;
   a pulse detector for discriminating a target pulse and an arrival time of the target pulse from the intermediate frequency signal and outputting a pulse detection signal; and
   an object motion detector for detecting whether or not the object is in motion based on the pulse detection signal output from the pulse detector, wherein:
   the expander includes:
      an oscillator for outputting a station-transmitted signal having a frequency different from a center frequency of the reception signal and a waveform independent of the phase and waveform of the pulse waves included in the reception signal, and
      a mixer for outputting the intermediate frequency signal by multiplying the reception signal and the station-transmitted signal, wherein
   the oscillator intermittently operates in synchronization with generation timings of the pulse waves included in the reception signal,
   the pulse detector receives the pulse waves a plurality of times at the arrival time at which the target pulse is discriminated and outputs reception intensities of the pulse waves as the pulse detection signal, and
   the object motion detector detects whether or not the object is in motion based on a variance value of the respective reception intensities obtained by receiving the pulse waves the plurality of times.

17. A reception device for receiving a transmission signal which is of an ultra wide band system, and has pulse waves arranged at a regular time interval, and has been incident on an object and reflected, the reception device comprising:
   an expander for outputting an intermediate frequency signal by frequency-converting a reception signal obtained by receiving the transmission signal;
   a pulse detector for discriminating a target pulse and an arrival time of the target pulse from the intermediate frequency signal and outputting a pulse detection signal; and
   an object motion detector for detecting whether or not the object is in motion based on the pulse detection signal output from the pulse detector, wherein:
   the expander includes:
      an oscillator for outputting a station-transmitted signal having a frequency different from a center frequency of the reception signal and a waveform independent of the phase and waveform of the pulse waves included in the reception signal, and
      a mixer for outputting the intermediate frequency signal by multiplying the reception signal and the station-transmitted signal, wherein
   the oscillator intermittently operates in synchronization with generation timings of the pulse waves included in the reception signal, and
   the pulse detector discriminates the target pulse by successively scanning areas from one near the reception device toward another distant from the reception device or from one distant from the reception device toward another near the reception device.

18. A reception device for receiving a transmission signal from a transmission device of an ultra wide band system, which is a communication signal used to transmit data in a non-coherent manner, comprising:
   an expander for outputting an intermediate frequency signal by frequency-converting a reception signal obtained by receiving the transmission signal;
   a filter which is connected after the expander and which permits the passage of a frequency component equivalent to a target pulse out of the intermediate frequency signal; and
   a pulse detector for discriminating the target pulse and an arrival time of the target pulse from the intermediate frequency signal and outputting a pulse detection signal, wherein:
   the expander includes:
      an oscillator for outputting a station-transmitted signal having a frequency different from a center frequency of the reception signal and a waveform independent of the phase and waveform of pulse waves included in the reception signal, and
      a mixer for outputting the intermediate frequency signal by multiplying the reception signal and the station-transmitted signal, wherein
   the oscillator intermittently operates in synchronization with generation timings of the pulse waves included in the reception signal,
   the expander outputs the intermediate frequency signal having a frequency lower than that of the reception signal by frequency-converting the reception signal obtained by receiving the communication signal such that the intermediate frequency signal has the same bandwidth as the target pulse and an upper limit of a passband of the filter is lower than a lower limit frequency of the target pulse,
   the communication signal includes a synchronization pulse train used to synchronize the transmission device and the reception device in transmission and reception of the communication signal and a data pulse train containing data to be transmitted,
   the pulse detector has a search mode for detecting a reception timing of the synchronization pulse train and a data mode for extracting the pulse detection signal from the data pulse train based on the reception timing of the synchronization pulse train detected in the search mode,
   the pulse detector outputs a period control signal used to adjust a timing of a reception period, which is a period during which frequency conversion of the reception signal is performed, and a duration of the reception period to the expander, and
   the expander intermittently operates during every reception period synchronized with the reception timing of the data pulse train at least while the pulse detector is operating in the data mode.

19. A reception device according to claim 18, wherein the pulse detector outputs a frequency control signal, used to adjust the frequency of the station-transmitted signal in the oscillator, to the oscillator.

20. A reception device according to claim 18, wherein the pulse detector outputs a band control signal, used to adjust the passband of the filter, to the filter.

21. A reception device according to claim 18, wherein:
the expander further includes a first amplifier for amplifying the intermediate frequency signal, and
the pulse detector outputs a first gain control signal, used to adjust an amplification factor of the first amplifier, to the first amplifier.

22. A reception device according to claim 21, wherein:
the expander further includes a second amplifier for amplifying the station-transmitted signal, and
the pulse detector outputs a second gain control signal, used to adjust an amplification factor of the second amplifier, to the second amplifier.

23. A reception device according to claim 18, wherein:
the pulse waves successively indicate the same bit value a predetermined number of times set beforehand, and
the pulse detector includes an integrator for integrating the intermediate frequency signal during a period of the predetermined number of times and a level determiner for outputting a result of binary level determination based on an integration result of the integrator as the pulse detection signal.

24. A reception device for receiving a transmission signal of an ultra wide band system, which is a communication signal used to transmit data in a non-coherent manner, comprising:
an expander for outputting an intermediate frequency signal by frequency-converting a reception signal obtained by receiving the transmission signal, wherein:
the expander includes:
an oscillator for outputting a station-transmitted signal having a frequency different from a center frequency of the reception signal and a waveform independent of the phase and waveform of pulse waves included in the reception signal, and
a mixer for outputting the intermediate frequency signal by multiplying the reception signal and the station-transmitted signal, wherein
the communication signal is a radio signal including the pulse waves, the pulse waves being arranged at a regular time interval, and
the oscillator intermittently operates in synchronization with generation timings of the pulse waves included in the reception signal, and
the reception device further comprises:
a reception unit for receiving the communication signal;
a section level acquirer for acquiring a signal level of the reception signal obtained by the reception unit for each of a first number of sections obtained by dividing the time interval;
a selection level storage for storing respective signal levels of the first number of sections, which are obtained by the section level acquirer in one-to-one correspondence with the first number of sections in a state where no communication signal is received by the reception unit;
a corrector for correcting the respective signal levels of the first number of sections received by the reception unit based on the respective signal levels of the first number of sections stored in the selection level storage; and
a demodulation unit for demodulating the communication signal according to the respective signal levels of the first number of sections corrected by the corrector.

25. A reception device according to claim 24,
wherein the section level acquirer acquires the respective signal levels of the first number of sections while successively shifting the first number of sections one after another each time acquirement is made.

26. A reception device according to claim 24,
wherein the section level acquirer acquires the respective signal levels of the first number of sections a second number of cycles, calculates an average value of the respective signal levels of each of the first number of sections over the second number of cycles, and causes the selection level storage to store the calculated average value of each section of the first number of sections as the signal level of each section.

27. A reception device according to claim 24,
wherein the corrector performs the correction by subtracting the signal level of each section stored in the selection level storage from that of each section received by the reception unit.

28. A reception device according to claim 24,
wherein the corrector performs the correction by adding a difference between a reference value set beforehand and the signal level of each section stored in the selection level storage to the signal level of each section received by the reception unit.

29. A reception device according to claim 24, wherein:
the selection level acquirer causes the section level storage to store a difference between a reference value set beforehand and the signal level acquired for each section as the signal level of each section; and
the corrector performs the correction by adding the signal level of each section stored in the selection level storage to the signal level of each section received by the reception unit.

* * * * *